(12) United States Patent
Schirmer

(10) Patent No.: US 8,870,561 B2
(45) Date of Patent: Oct. 28, 2014

(54) LAYER SEQUENCE REPEATER MODULE FOR A MODULAR DISK CO-EXTRUSION DIE AND PRODUCTS THEREOF

(71) Applicant: BBS Corporation, Spartanburg, SC (US)

(72) Inventor: Henry G. Schirmer, Spartanburg, SC (US)

(73) Assignee: BBS Corporation, Spartanburg, SC (US)

( * ) Notice: Subject to any disclaimer, the term of this patent is extended or adjusted under 35 U.S.C. 154(b) by 0 days.

(21) Appl. No.: 13/752,458

(22) Filed: Jan. 29, 2013

(65) Prior Publication Data
US 2013/0243894 A1    Sep. 19, 2013

Related U.S. Application Data

(60) Provisional application No. 61/611,943, filed on Mar. 16, 2012.

(51) Int. Cl.
| | | |
|---|---|---|
| *B29C 47/26* | (2006.01) | |
| *B29C 47/70* | (2006.01) | |
| *B29C 47/06* | (2006.01) | |
| B29C 47/08 | (2006.01) | |
| B29C 47/00 | (2006.01) | |
| B29C 47/56 | (2006.01) | |

(52) U.S. Cl.
CPC ............... *B29C 47/06* (2013.01); *B29C 47/707* (2013.01); *B29C 47/0828* (2013.01); *B29C 47/061* (2013.01); *B29C 47/065* (2013.01); *B29C 47/263* (2013.01); *B29C 47/0026* (2013.01); *B29C 47/0021* (2013.01); *B29C 47/56* (2013.01)
USPC .................. 425/133.1; 425/131.1; 425/133.5; 425/463; 425/467; 264/171.26; 264/171.27; 264/173.11; 264/173.12; 264/173.16

(58) Field of Classification Search
CPC .... B29C 47/26; B29C 47/261; B29C 47/263; B29C 47/0026; B29C 47/061; B29C 47/065
USPC ............. 264/171.26, 171.27, 173.11, 173.12, 264/173.16; 425/131.1, 133.1, 133.5, 463, 425/467
See application file for complete search history.

(56) References Cited

U.S. PATENT DOCUMENTS

| | | |
|---|---|---|
| 2,820,249 A | 1/1958 | Colombo |
| 3,308,508 A | 3/1967 | Schrenk |

(Continued)

FOREIGN PATENT DOCUMENTS

| | | |
|---|---|---|
| DE | 199 27 556 A1 | 12/2000 |
| EP | 0 471 879 A1 | 2/1992 |

(Continued)

OTHER PUBLICATIONS

Henry G. Schirmer, Jean-Francois Glez, Mark Pucci, "Nano-Layer Structural Advances in Shrink Films", SPE Polyolefins 2013 Conference, Houston, Texas, Feb. 2013, 13 pages.

(Continued)

*Primary Examiner* — Joseph S Del Sole
*Assistant Examiner* — Lawrence D Hohenbrink, Jr.
(74) *Attorney, Agent, or Firm* — Pauley Petersen & Erickson

(57) ABSTRACT

A layer sequence repeater module for a co-extrusion die includes a cell formed of a plurality of thin annular disks stacked on top of each other in an axial direction of the co-extrusion die. Each disk includes a plurality of openings aligned with openings in the adjacent disks, thus forming multiple inner and outer melt passages. At least one of the layer sequence repeater module includes at least one first cap disk, at least one second cap disk, at least one distribution disk, at least one repeater disk and at least one spreader disk. The layer sequence repeater module may be a separately assembled and individually removable module of the co-extrusion die. Alternatively or additionally, the layer sequence repeater module may be incorporated into a module of the co-extrusion die.

23 Claims, 10 Drawing Sheets

(56) References Cited

U.S. PATENT DOCUMENTS

| | | | |
|---|---|---|---|
| 3,321,803 A | 5/1967 | Corbett | |
| 3,565,985 A | 2/1971 | Schrenk et al. | |
| 3,756,758 A | 9/1973 | Prall | |
| 3,759,647 A | 9/1973 | Schrenk et al. | |
| 3,924,990 A | 12/1975 | Schrenk | |
| 3,980,744 A | 9/1976 | Cogswell | |
| 4,125,585 A | 11/1978 | Rosenbaum | |
| 4,167,383 A | 9/1979 | Murakami et al. | |
| 4,208,175 A | 6/1980 | Rosenbaum | |
| 4,249,875 A | 2/1981 | Hart et al. | |
| 4,669,965 A | 6/1987 | Murakami | |
| 4,715,803 A | 12/1987 | Koppa | |
| 4,772,195 A | 9/1988 | Touchet | |
| 4,798,526 A | 1/1989 | Briggs et al. | |
| 4,832,589 A | 5/1989 | Gini et al. | |
| 4,889,477 A | 12/1989 | Wortberg et al. | |
| 5,035,596 A | 7/1991 | Pohl | |
| 5,076,776 A | 12/1991 | Yamada et al. | |
| 5,292,472 A | 3/1994 | Tompkins | |
| 5,516,472 A | 5/1996 | Laver | |
| 5,518,036 A | 5/1996 | DeMasters et al. | |
| 5,538,411 A | 7/1996 | Gates | |
| 5,690,972 A | 11/1997 | Planeta et al. | |
| 5,723,157 A | 3/1998 | Grütjen | |
| 5,762,971 A | 6/1998 | Schirmer | |
| 6,000,926 A | 12/1999 | Schirmer | |
| 6,383,539 B1 | 5/2002 | Akutagawa | |
| 6,413,595 B1 * | 7/2002 | Schirmer | 264/171.27 |
| 8,241,736 B2 | 8/2012 | Ramli et al. | |
| 2001/0000234 A1 | 4/2001 | Helms, Jr. et al. | |
| 2010/0072655 A1 * | 3/2010 | Roberts et al. | 264/171.13 |
| 2013/0009336 A1 * | 1/2013 | Ausen et al. | 264/177.1 |

FOREIGN PATENT DOCUMENTS

| | | |
|---|---|---|
| EP | 0 626 247 A1 | 11/1994 |
| FR | 2 625 941 | 7/1989 |
| GB | 2 161 745 A | 1/1986 |
| WO | WO 2011/119323 A1 | 9/2011 |

OTHER PUBLICATIONS

Walter J. Schrenk and Turner Alfrey Jr., "Coextruding Multilayer Blown Film—Part 1", SPE Journal, v. 29 pp. 38-42, Jun. 1973.

Walter J. Schrenk and Turner Alfrey Jr., "Coextruding Multilayer Blown Film—Part 2", SPE Journal, v. 29 pp. 43-47, Jul. 1973.

* cited by examiner

LAYER SEQUENCE REPEATER MODULE FOR A MODULAR DISK CO-EXTRUSION DIE AND PRODUCTS THEREOF

CROSS-REFERENCE TO RELATED APPLICATION

This application claims the benefit of and priority to U.S. Provisional Application No. 61/611,943, filed 16 Mar. 2012, the entirety of which application is incorporated herein by reference.

FIELD OF INVENTION

The present invention relates to a layer sequence repeater module for an annular die for extruding thermoplastic materials as well as products thereof. More particularly, the present invention relates to an assembly of thin annular disks for an annular co-extrusion die and multi-layer products thereof.

BACKGROUND OF THE INVENTION

Annular dies, such as, for example, co-extruded blown film dies, are used to form multi-layer products, e.g., blown films, from thermoplastic melts (hereinafter "melt"). Typically, modular co-extruded blown film dies include a module formed of an assembly of cells. Each cell usually includes several annular disks and produces one layer of a multi-layer product. Because each cell normally produces only one layer, conventional modular annular dies producing multi-layer products tend to become more bulky as more layers are added.

Co-extruded blown film dies have progressed to more and more layers over the past twenty years in order to combine diverse materials valued for performance enhancement or film properties in order to make unique specialty films. Most are now in the range of 7 to 11 layers. All vary in thickness capabilities but all may be termed as being able to make films containing micro-scale layers (hereinafter "micro-layer").

Annular co-extruded films, tubing and parisons can vary in total thickness to the extent to which the melt is drawn from the die. The faster a melt is drawn the thinner it will be. Corresponding micro-layers within the total film thickness will be likewise proportionally affected in thickness by the draw. So the absolute thickness of any micro-layer is a moving target and may be best expressed in terms of relative thickness. Micro-layers within the standard co-extruded films usually may vary in relative thickness over a range from 1% to 100% of the total thickness. This limitation is related to total output rate of the film line and the maximum residence time of the melts within the die system before the polymer melt starts to degrade.

For example, layers within a typical 10-mil thick multi-layer product produced by conventional or modular annular dies are considered micro-layers, and typically range in thickness from about 0.1 mil to about 10 mils, and conventional and modular annular dies typically produce multi-layer products having anywhere from about 7 to 11 layers. Because cells that produce micro-layers in a modular annular die are relatively thick, increasing the number of micro-layers in a multi-layer product typically undesirably increases the overall thickness of the module containing these cells. Other conventional annular dies also have similar dimensional limitations.

There is an ongoing need for an improved modular annular die for producing multi-layer products with more, thinner layers. There is an ongoing need for multi-layer products having a higher number of layers that produce synergistic material responses such as mimicking the properties of blends without the incompatibility issues generally associated with blends. There is also a need to have films with very thin nano-layer bundles dispersed within a matrix of micro-layers so that the synergistic behavior of multiple materials in nano-layer form is not shackled by loss of high strength seal performance. Finally, there is an ongoing need for multi-layer products having many layers squeezed into the thickness or height dimensions that characterize most annular co-extrusion dies.

SUMMARY OF THE INVENTION

The present invention is directed to a layer sequence repeater module for an annular co-extrusion die. The layer sequence repeater module of the present invention includes an assembly of thin annular disks, including at least one first cap disk, at least one distribution disk, at least one second cap disk, at least one repeater disk and at least one spreader disk. Desirably, the layer sequence repeater module of this invention includes one or more of each of the above-listed disks, depending on need. In a preferred embodiment of this invention, the entire layer sequence repeater module and/or any component disk thereof is disposable and individually replaceable.

The layer sequence repeater module of this invention can be incorporated into an existing module of an annular co-extrusion die, or, alternatively or additionally, can be a separately assembled and removable component within an annular co-extrusion die.

In one embodiment, the layer sequence repeater module includes a forward distribution section at the entry end of the layer sequence repeater module, and a reverse distribution section at the exit end of the layer sequence repeater module. Each distribution section includes a distribution disk sandwiched between a first cap disk and a second cap disk. Each distribution section distributes one melt and directs the flow of the distributed melt to inner passages and/or openings of repeater disk(s) and spreader disk(s) of the layer sequence repeater module, whereby each melt is formed into one or more layers. The forward distribution section directs the flow of the melt it distributes in a forward direction. The forward direction within the layer sequence repeater module extends from the entry end to the exit end thereof. The reverse distribution section directs the flow of the melt it distributes in a reverse direction. The reverse direction within the layer sequence repeater module extends from the exit end to the entry end thereof. Thus, in at least one embodiment of the layer sequence repeater module according to this invention, two or more melts flow in opposite directions.

The layer sequence repeater module may include additional distribution sections, each distributing at least one additional melt. Each additional distribution section may be a forward distribution section or a reverse distribution section, as described above. In one embodiment of this invention, the layer sequence repeater module only includes one or more forward distribution sections and no reverse distribution section. In another embodiment of this invention, the layer sequence repeater module only includes one or more reverse distribution sections and no forward distribution section.

The layer sequence repeater module further includes one or more repeater disks and one or more spreader disks. The repeater disk(s) and spreader disk(s) are alternately positioned within the layer sequence repeater module and receive distributed melts from one or more distribution sections and/or distributed disks. In one embodiment of the layer sequence repeater module including a forward distribution section and a reverse distribution section, the spreader disks and repeater disks are preferably positioned between the two distribution sections.

In operation, one or more melts are fed into one or more entry openings of the first cap disk. From the first cap disk, melts are directed to the remaining disks of the layer sequence repeater module. Specifically, melts may be directed to one or more distribution disks. Each distribution disk distributes one melt and directs the distributed melt from a plurality of distribution outlet openings of the distribution disk into a corresponding plurality of inner flow openings of a second cap disk and/or a plurality of inner passages of a repeater disk. After distribution, each melt flows in corresponding selections, respectively, of inner passages of repeater disks and inner openings of spreader disks. Specifically, each repeater disk has a plurality of inner passages, including one or more selections of inner passages, where each selection of inner passages accommodates one melt. In one embodiment, a selection of inner passages includes eight inner passages. Similarly, each spreader disk has a plurality of inner openings, including one or more selections of inner openings, where each selection of inner openings accommodates one melt. In one embodiment, a selection of inner openings includes eight inner openings. Desirably, one or more selections of inner passages correspond with one or more selections of inner openings, such as to provide a continuous flow path for each melt within the layer sequence repeater module. Each spreader disk further includes a flow region connected to a first selection of inner openings. The melt received by the first selection of inner openings of the spreader disk is desirably formed into a layer. The spreader disk forms a layer from a desired melt by positioning the spreader disk such that the first selection of inner openings receive the flow of the desired melt. Spreader disks desirably alternate with repeater disks such that every other disk is a spreader disk.

Because the spreader disks and repeater disks desirably alternate within the layer sequence repeater module, a layer can be formed by every other disk. Consequently, and because of the minimal thicknesses of the disks, the layer sequence repeater module according to the present invention lends itself to producing multiple-layer products with a die that is much less massive than conventional dies.

As the number of layers within a co-extruded film product increases and the corresponding layer thickness decreases, film property changes may be seen. For example, films can be made in the order of 25 layers where every other layer was an elastomer. The film properties become closer to a physical blend of the two materials without having the usual incompatibility issues such as optical haze or lowered physical properties to develop.

On the other hand, there are advantages to having one or more thicker layers strategically placed within very many thinner layers. An example would be to achieve a higher seal strength especially if the interlayer bond strength of the inner layers were weaker than the seal strength desired. Therefore, having both thicker and thinner layers within the same film structure can be extremely desirable.

In order to better identify thicker and thinner layers within the same film structure, there is a thickness term used herein to identify the thinner layers from the layer sequence repeater (LSR) module of the invention. Since the thickness of the thinner layers produced by the LSR module of this invention is at least about 10% less than the thickness of a corresponding micro-layer, these layers are herein defined using the next smaller measurement unit. Hereinafter, the term "nano-layer" will be used to refer to the thinner layers formed by the LSR module of this invention. Nano-layers typically have thickness measured in nanometers, in the sub-micron range.

In general, nano-layers will appear within a film structure having micro-layers as the major materials and therefore are clearly recognized by the fact that they appear in bundles of nano-layers, each nano-layer being in the order of about 10% or more thinner than the surrounding micro-layers.

There is a region where the thickness of the nano-layers may approach that of some of the surrounding micro-layers. This is most likely to happen in the 1-10% thickness region that in the thicker layers. The overlap is an inevitable consequence of operating at the limits of die and material capability. However, the clearly identifiable feature of having nano-layer bundles dispersed amongst micro-layers is a unique and identifiable feature of nano-layers produced by an LSR module.

The LSR module will be shown to produce many layers in a designed sequence that is joined in a parallel flow arrangement where each material is permitted to flow in a slower more natural fashion without undue stress developing. Because the melt flow undergoes less manipulation, the quality of the layers produced is very high and similar to the surrounding micro-layers. The annular nature of the LSR module also distinguishes it from the layer multiplier. Films blown from annular dies tend to have more balanced properties than films drawn from flat dies.

The layer sequence repeater module of the present invention produces nano-scale layers (hereinafter "nano-layer") that are at least about 10% thinner, and can be an order of magnitude thinner than micro-scale layers produced by conventional modular dies.

Other advantages will be apparent to those skilled in the art from the following detailed description taken in conjunction with the drawings.

DETAILED DESCRIPTION OF EMBODIMENTS

Those skilled in the art and following the teachings herein provided will appreciate that while the descriptions below of various layer sequence repeater modules of this invention include preferred configurations, such configurations are used for illustrative purposes only and may be modified as appropriate, depending on need.

The present invention relates to a layer sequence repeater module for an extrusion and/or a co-extrusion die. The layer sequence repeater module includes at least one cell that includes a plurality of axially disposed thin annular disks. The layer sequence repeater module can be used in a co-extrusion die to extrude or co-extrude resin materials to form multi-layer products, such as, for example, blown films containing nano-layers. The layer sequence repeater module of this invention used in a modular disk die may also be used to create a co-extruded tube, such as a hose, a co-extruded rod formed from multiple continuous layers of material to create a generally solid rod structure, or parison (a generally elliptical uninflated tube used in blow molding). The present invention is also directed to multi-layer products, especially those containing nano-layers, produced by the layer sequence repeater module and dies incorporating one or more layer sequence repeater modules of this invention.

The layer sequence repeater module of the present invention may be used in a modular disk co-extrusion device, such as the co-extrusion die disclosed in U.S. Pat. No. 5,762,971, issued 9 Jun. 1998, U.S. Pat. No. 6,000,926, issued 14 Dec. 1999, and/or U.S. Pat. No. 6,413,595, issued 2 Jul. 2002. The above-listed U.S. patents are hereby incorporated by reference herein in their entirety and are made a part hereof, including but not limited to those portions which specifically appear hereinafter.

The layer sequence repeater module of the present invention can be a module of a co-extrusion die. For example, one or more layer sequence repeater modules of this invention may be incorporated into any of the modules disclosed in the above-referenced U.S. patents. Alternatively or additionally, one or more layer sequence repeater modules of the present invention can be employed as separately assembled and removable components of a multi-component-module within a co-extrusion die. For example, with reference to U.S. Pat. No. 5,762,971, the layer sequence repeater module of this invention may be formed as one or more co-extrusion dies cells, or may be employed as a separately assembled and removable component positionable between two adjacent cells, or may be insertable into one or more of cells. A co-extrusion die may include one or more layer sequence repeater modules according to this invention.

Figure 1:
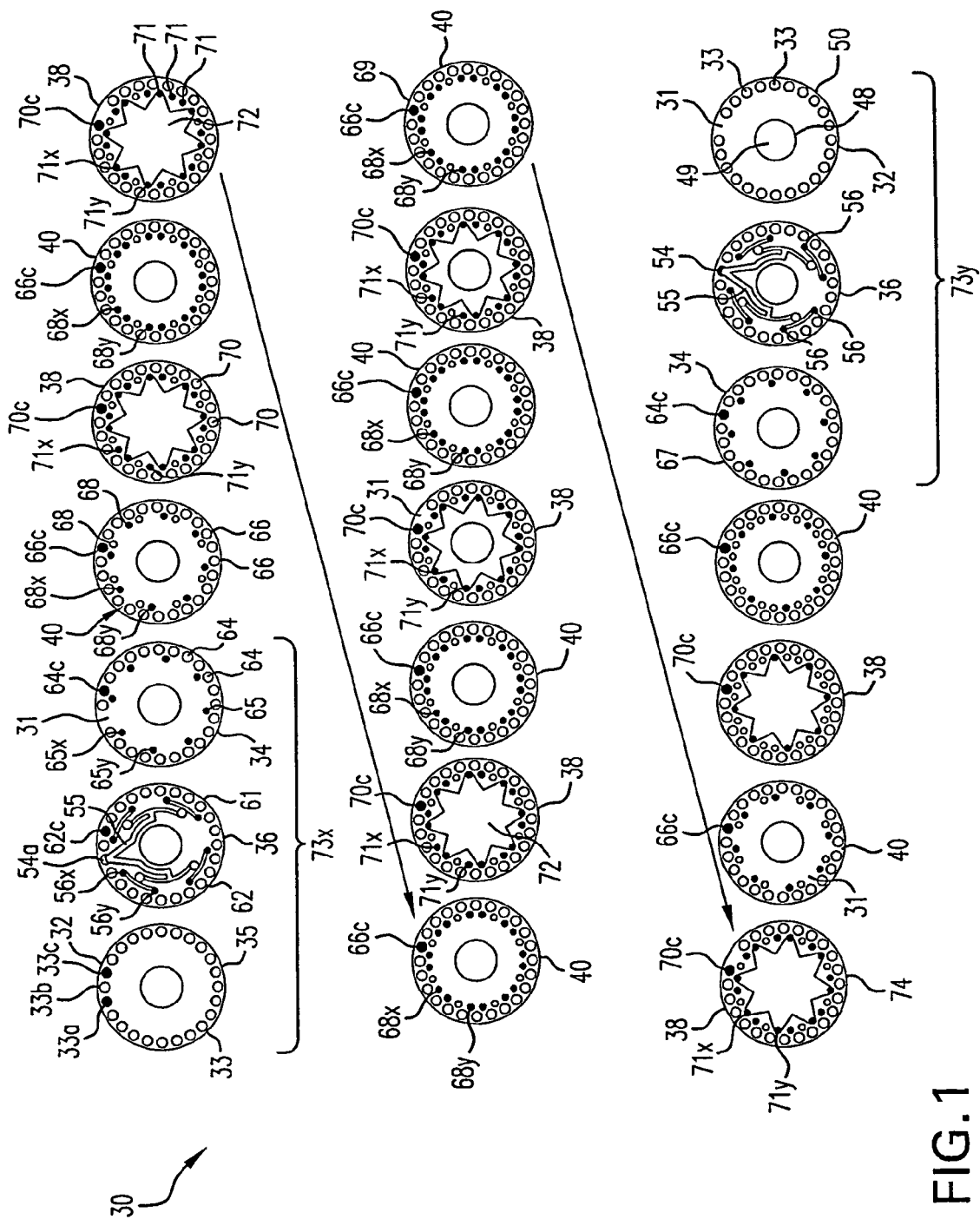
FIG. 1 is a side-by-side line up of disks forming a cell of a layer sequence repeater module according to one embodiment of the present invention, including seven spreader disks forming seven layers from two melts.

The layer sequence repeater module of the invention will now be described in greater detail. Referring to FIG. 1, layer sequence repeater module 30 includes at least one cell formed of a plurality of axially disposed thin annular disks. In the embodiment shown in FIG. 1, the layer sequence repeater module includes only one cell, and the reference numeral 30 refers to that cell as well as to the entire layer sequence repeater module. The plurality of thin annular disks include at least one first cap disk 32, at least one second cap disk 34, at least one distribution disk 36, at least one spreader disk 38 and at least one repeater disk 40, arranged such that the layer sequence repeater module 30 produces at least one and preferably a plurality of layers of extruded material. The layer sequence repeater module 30 of the present invention may form one or more nano-layers. In one embodiment of the present invention, the layer sequence repeater module 30 is incorporated into a co-extrusion die, such as the co-extrusion die 42 shown in FIG. 12, to produce a plurality of nano-layers sandwiched between two or more micro-layers.

Figure 13:
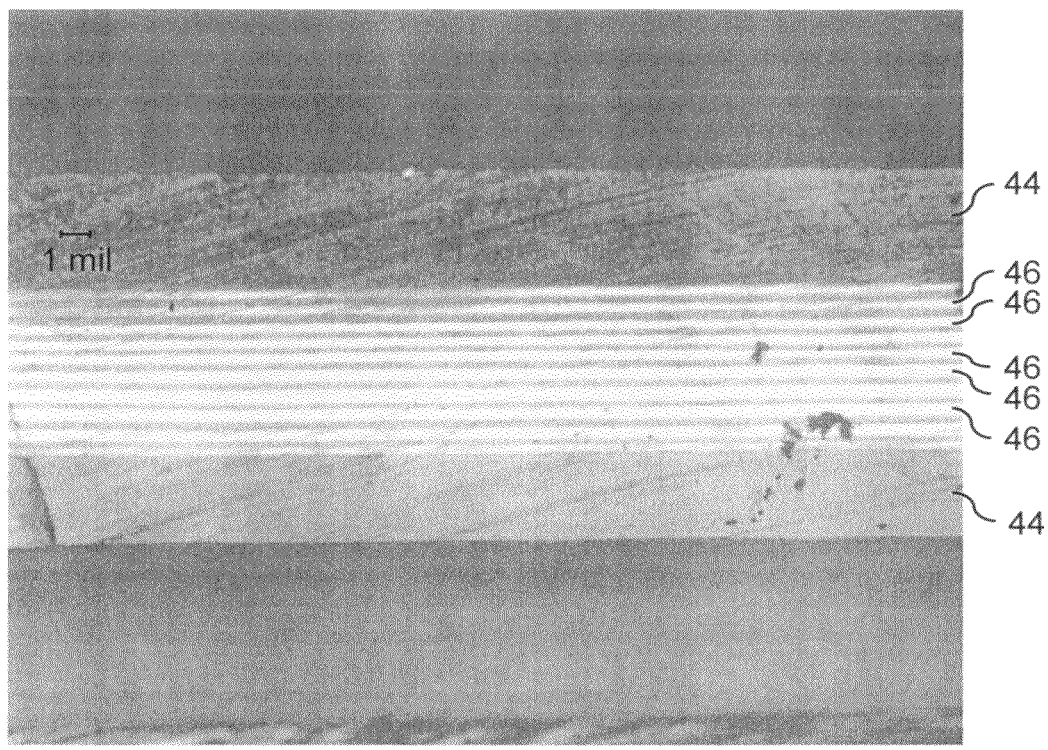
FIG. 13 is a cross-sectional view of a multi-layer product (Sample 8-16, Table 7) of a die including the layer sequence repeater module of the present invention, viewed under 100 times magnification, where the multi-layer product has the following structure and the acronym "EVOH" refers to "ethylene-vinyl alcohol": polyethylene/polyethylene/adhesive/EVOH/adhesive/EVOH/adhesive/EVOH/adhesive/EV OH/adhesive/EVOH/adhesive/EVOH/adhesive/EVOH/adhesive/EV OH/adhesive/EVOH/adhesive/EVOH/adhesive/polyethylene/polyethylene.
Figure 14:
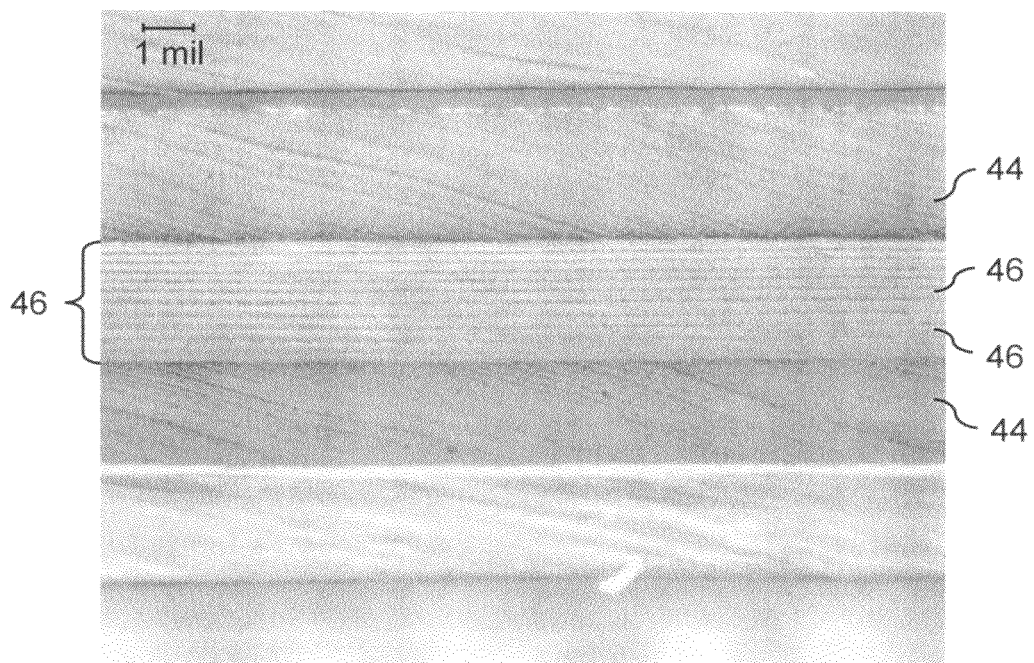
FIG. 14 is a cross-sectional view of another multi-layer product (Sample 7-9, Table 2) of a die including the layer sequence repeater module of the present invention, viewed under 200 times magnification.
Figure 15:
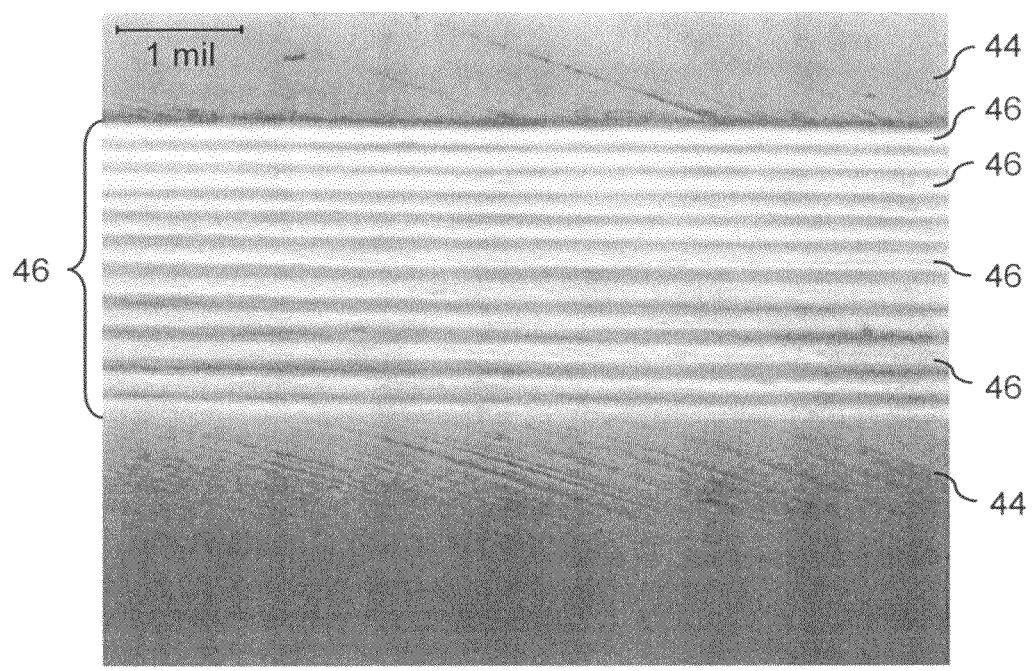
FIG. 15 is a cross-sectional view of the multi-layer product shown in FIG. 14, viewed under 500 times magnification.

The term "nano-layer" as used throughout this specification means a layer of extruded material, the thickness of which is at least about 10% less than the thickness of a micro-layer, suitably at least about 50% less than the thickness of a micro-layer, and can be an order of magnitude (at least about 90% less) than the thickness of a micro-layer. Micro-layers typically have the thicknesses measured in micrometers or microns. The thickness of a micro-layer may range from about 1-1000 microns, suitably about 10-500 microns, or about 25-250 microns. Nano-layers typically have thicknesses measured in nanometers. The thickness of a nano-layer is typically less than one micron (1000 nanometers) and may range from about 1-1000 nanometers, suitably about 10-900 nanometers, or about 20-800 nanometers. Micro-layers 44 and nano-layers 46 are illustrated in FIGS. 13-15, described below.

Figure 2:
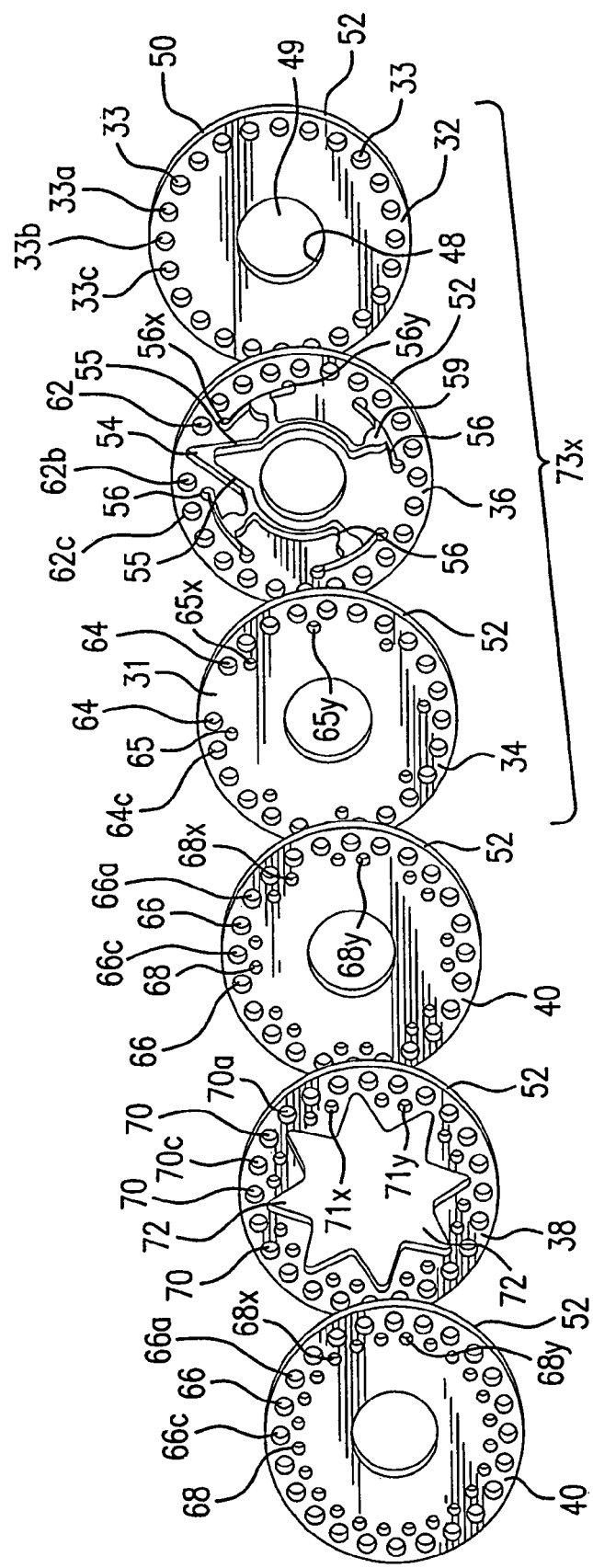
FIG. 2 is an exploded perspective view of the first six aligned disks of the cell of the layer sequence repeater module shown in FIG. 1.
Figure 12:
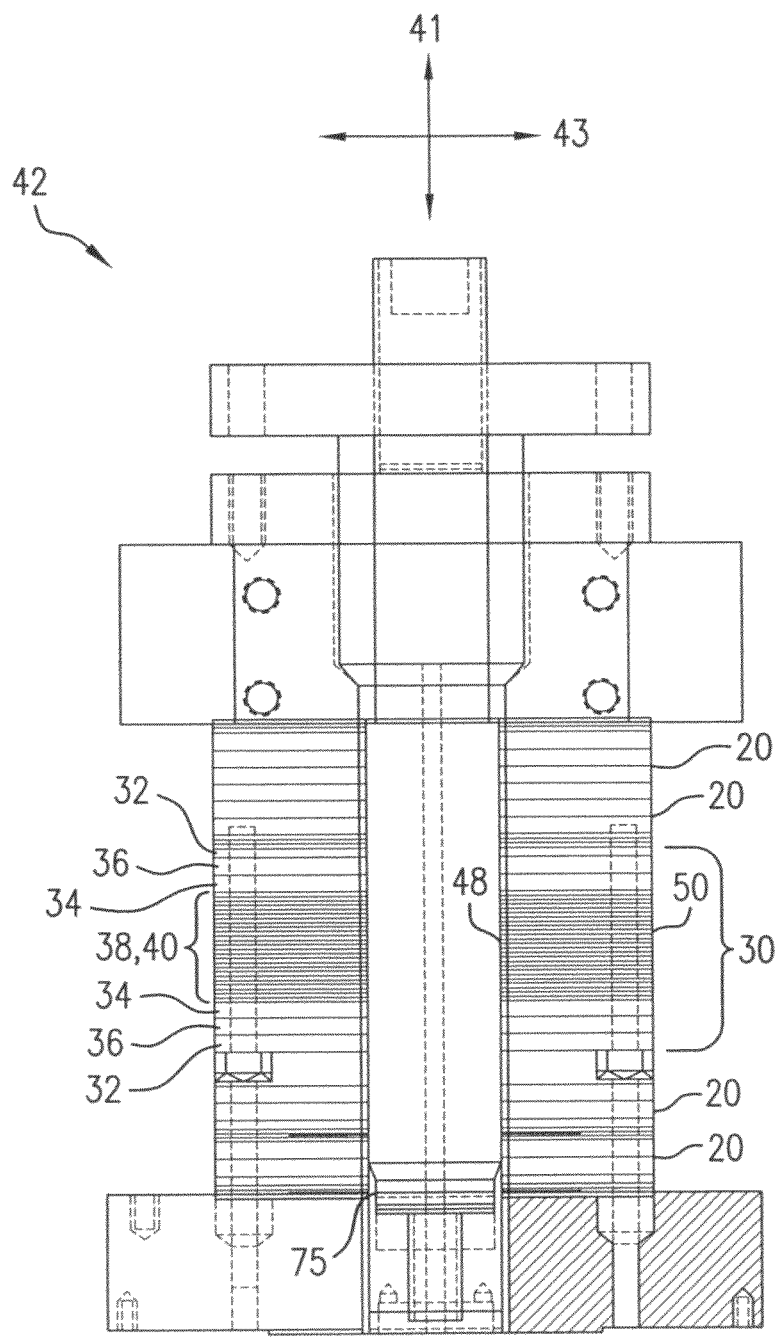
FIG. 12 is a cross-sectional view of a die including the layer sequence repeater module of the present invention.

As illustrated in FIG. 2, each thin annular disk has an inner radius 48, defining a central opening 49, an outer radius 50 and a thickness 52. Different disks may have different thicknesses, depending on the position and/or function of the disk in the assembly of thin annular disks. The thin annular disks forming the layer sequence repeater module 30 are stacked on top of each other in the axial direction 41 of the modular disk die 42, as shown in FIG. 12. Radial direction 43 of the modular disk die 42 is desirably perpendicular to the axial direction 41. The axial and radial directions of each thin annular disk correspond with the axial direction 41 and the radial direction 43, respectively, of the modular disk die 42.

The thin annular disks that form the layer sequence repeater module 30 of this invention will now be described in greater detail.

The term "opening", "channel" or "passage" as used throughout this specification means an opening, a channel or a passage, respectively, extending in an axial direction of the thin annular disk through the entire thickness of the disk.

The first cap disk 32 includes at least two entry openings 33 disposed along or with respect to a circumference 35 of the first cap disk 32. In one embodiment, as shown in FIG. 1, the first cap disk 32 includes a plurality of entry openings 33 radially disposed along the circumference of the first cap disk 32. The first cap disk 32 may include any desired number of entry openings 33. In one embodiment, shown in FIG. 1, the first cap disk 32 includes twenty-four entry openings 33 arranged in eight sets of three entry openings 33a, 33b and 33c, for receiving corresponding melt streams a, b and c. Each set is disposed at an angle relative to the adjacent sets. One or more resin streams can be supplied to the layer sequence repeater module 30 through one or more entry openings 33. Up to twenty-four resin streams can be supplied to the first cap disk 32 including twenty-four entry openings 33. The design of the first cap disk 32 including twenty-four entry openings 33 may allow three, six, twelve, or even twenty-four resin streams to be supplied to the layer sequence repeater module 30, depending on how many sets are used. In the embodiment shown in FIG. 3, only one set of three entry openings 33 may be used, namely entry openings 33a, 33b, and 33c. In the embodiment shown in FIG. 1, only two entry openings 33 of one set of three entry openings 33 may be used, namely, entry openings 33a and 33c. In other embodiments (not shown), each set of entry openings may contain fewer or more than three entry openings, and each first cap disk may contain more or less than eight sets. For example, a first cap disk may contain two sets of six entry openings in rows of three so that up to twenty-four melt streams can be delivered to the layer sequence repeater module.

For illustration purposes, the design of the layer sequence repeater module 30 shown in FIG. 1 produces a seven-layer product using two resin streams, designated as streams a and c. Thus, for example, as used herein, entry opening 33a is an entry opening for resin stream a, while entry opening 33c is an entry opening for resin stream c. These stream designations also apply to openings and/or passages in the remaining annular disks described below. Thus, the layer sequence repeater module shown in FIG. 1 is shown with all but two of the entry openings being unused.

Figure 3:
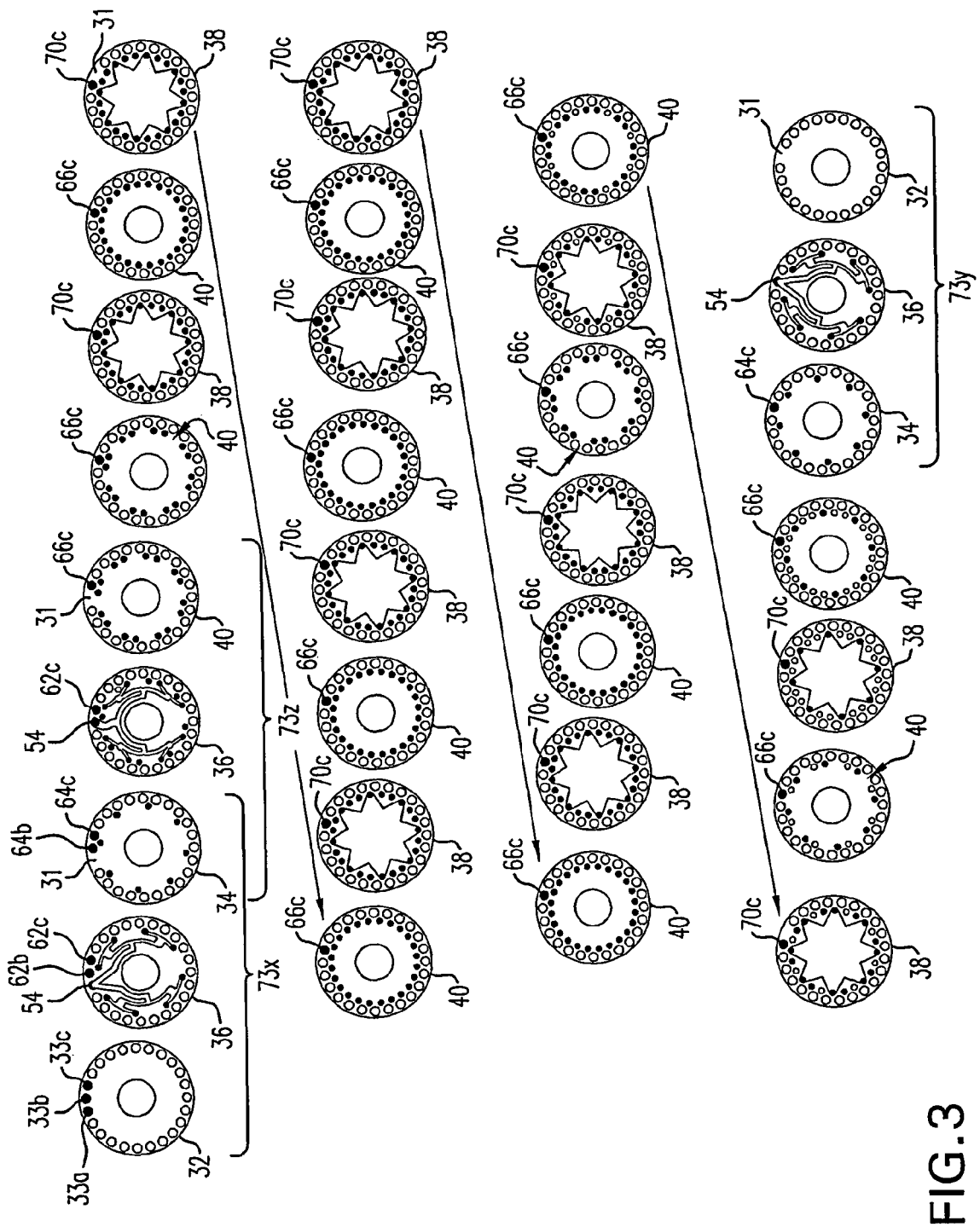
FIG. 3 is a side-by-side line up of disks forming a cell of a layer sequence repeater module according to one embodiment of the present invention, including eleven spreader disks forming eleven layers from three melts.
Figure 4:
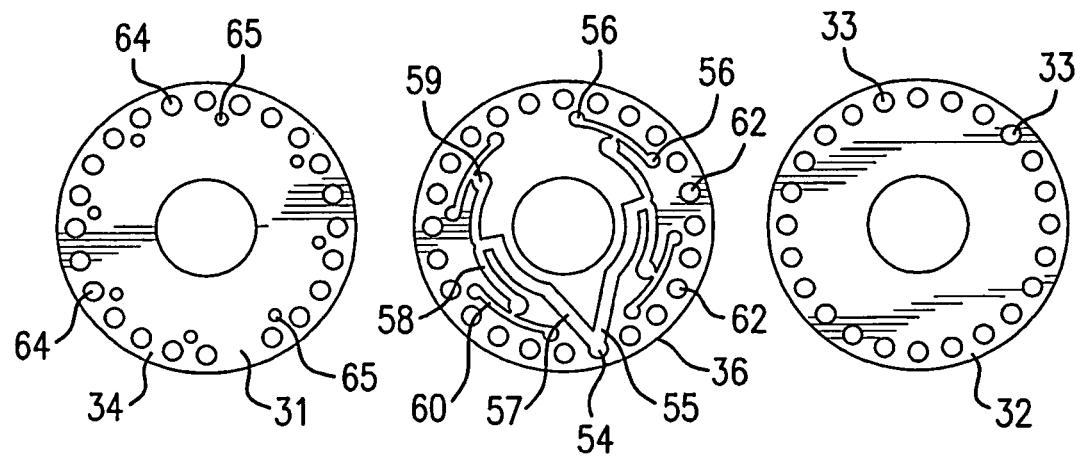
FIG. 4 is a side-by-side line up of disks forming a reverse distribution section of one embodiment of a cell of the layer sequence repeater module of the present invention.

One or more entry openings 33 of the first cap disk 32 may be replaced with a termination point. A termination point terminates the flow of a melt within the layer sequence repeater module at the termination point and prevents the melt to flow to the next disk, if any. A termination point preferably is a physical barrier and/or the lack of an opening. The first cap disk 32 shown in FIG. 5 includes a termination point 31. A first cap disk 32 including a termination point 31 may be used in a reverse distribution section. For example, as shown in FIGS. 1 and 3, the first cap disk 32 positioned at the exit end of the layer sequence repeater module 30 may include a termination point 31, terminating the flow of the melt being distributed by the adjacent distribution disk 36.

In one embodiment, for example as shown in FIG. 1, a distribution disk 36 is axially adjacent to the first cap disk 32. When a first disk is "axially adjacent" to a second disk, it is meant that the first disk is axially or vertically closest to the second disk, as shown in FIG. 2. The distribution disk 36 includes a distribution inlet opening 54, such as the distribution inlet opening 54a shown in FIG. 1, that extends through the distribution disk 36. The distribution inlet opening 54a may be axially aligned with one entry opening 33 of the first cap disk 32. For example, the distribution inlet opening 54a may be aligned with entry opening 33a, 33b or 33c of the first cap disk 32 to receive melts a, b or c, respectively, for distribution. The distribution inlet opening 54a is connected to a channel 55 that also extends through the distribution disk 36.

The channel 55 terminates at a plurality of distribution outlet openings 56x, 56y that extend through the distribution disk 36. By the terms "outlet opening" or "channel," it is meant that the described portion is an opening in the disk such that the portion penetrates or extends through the entire axial thickness of the disk. Each outlet opening 56x, 56y is disposed at an angle, for example, of 45°, relative to the adjacent distribution outlet openings. In one embodiment, the distribution disk 36 includes eight outlet openings 56x, 56y.

Figure 5:
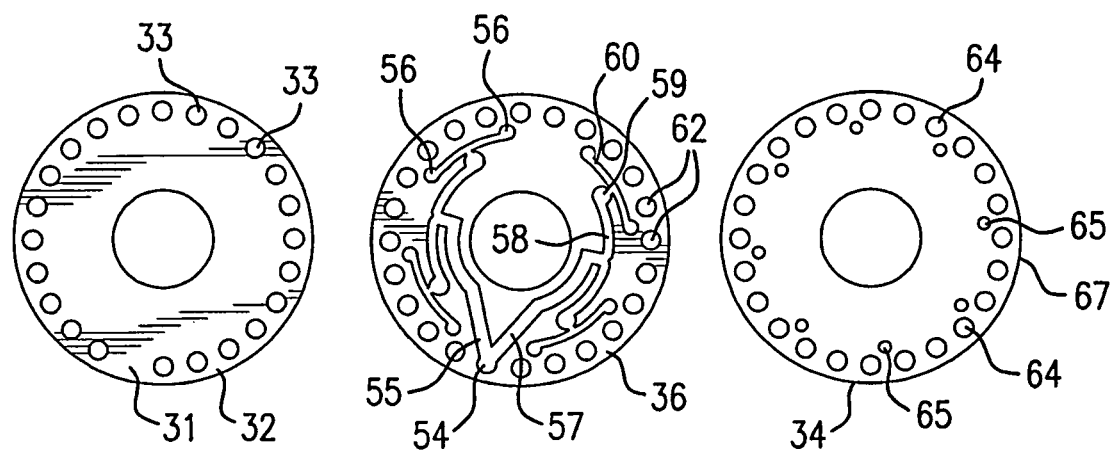
FIG. 5 is a side-by-side line up of disks forming a forward distribution section of one embodiment of a cell of the layer sequence repeater module of the present invention.

The axial alignment of the distribution inlet opening 54, 54a with respect to the entry openings 33a, 33b or 33c of the first cap disk 32 determines the resin stream that is distributed by the distribution disk 36. For example, referring to FIG. 3, the distribution disk 36 may be aligned so that stream b is distributed by the distribution disk 36 by aligning the inlet opening 54 with entry opening 33b of the first cap disk 32. The distribution disk 36 may be aligned with entry opening 33a, so that stream a is distributed by the distribution disk 36. The distribution disk 36 may be aligned with entry opening 33c, so that stream c is distributed by the distribution disk 36. As best shown in FIG. 5, the channel 55 may include a first split channel 57, a second split channel 58, a relief zone 59, and a third split channel 60. Preferably, the split channels symmetrically divide the melt selected by the distribution inlet opening 54 ("selected melt"). More particularly, each first split channel 57 preferably directs about one-half of the amount of the selected melt from the distribution inlet opening 54 to its adjacent second split channels 58. Similarly, each second split channel 58 directs about one-half of the amount of selected melt from the first split channel 57 to its adjacent third split channels 60. A relief zone 59 is preferably provided to allow a momentary rest of the selected melt flow before it flows into the third split channels 60. As previously described, one of eight distribution outlet openings 56x, 56y terminates each end of the third split channels 60. The split channels thus preferably split the selected melt stream until its flow geometry becomes annular.

Figure 6:
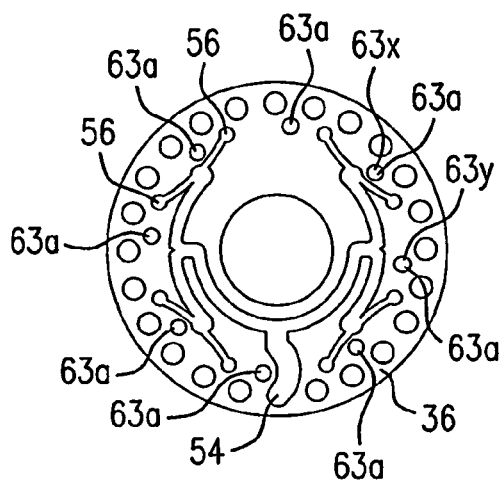
FIG. 6 is a top view of a distribution disk according to one embodiment of the present invention, including one selection of inner distributor openings.
Figure 7:
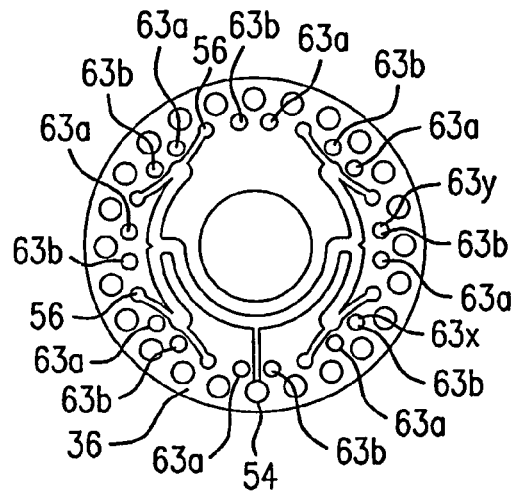
FIG. 7 is a top view of a distribution disk according to another embodiment of the present invention, including two selections of inner distributor openings.

The distribution disk 36 illustrated in FIG. 1 includes a plurality of outer distributor openings 62. The number of outer distributor openings 62, including the distribution inlet opening 54a, may correspond to the number of entry openings 33 of the first cap disk 32, the number of outer flow openings 64 of the second cap disk 34 (described below) and/or the number of outer passage openings 66 of the repeater disk 40 (described below). For example, in one embodiment of this invention, as shown in FIG. 1, the distribution disk 36 of the forward distribution section 73x includes twenty three outer distributor openings 62 and one distribution inlet opening 54a (a total of twenty-four openings), and the adjacent first cap disk 32 includes twenty-four corresponding entry openings 33. One or more entry openings 33 of the first cap disk 32 preferably correspond with one or more respective outer distributor openings 62 of the distribution disk 36. While one melt is desirably distributed by the distribution disk 36, outer distributor openings 62 allow one or more additional melts to pass to the next thin annular disk. Aligned openings and/or passages of adjacent disks form axially-oriented flow paths for each melt within the layer sequence repeater module of this invention. In certain embodiments of this invention, for example as shown in FIGS. 6 and 7, distribution disk 36 further includes a plurality of inner distributor openings 63, namely 63a and 63b. The plurality of outer distributor openings 62 and the plurality of inner distributor openings 63 are concentric sets of openings, and each set is circumferentially arranged along or with respect to a circumference 61 of the distribution disk 36. The plurality of inner distributor openings 63 may include one or more selections of inner distributor openings. While one melt is desirably being distributed by the distribution disk 36, each selection of inner distributor openings may allow one additional melt, previously distributed by a different distribution disk 36, to pass to the next thin annular disk. For example, in one embodiment of this invention, the plurality of inner distributor openings 63 include one selection of inner distributor openings, such as the first selection of inner distributor openings 63*a* shown in FIG. 6, accommodating one additional melt. In another embodiment of this invention, the plurality of inner distributor openings 63 include two selections of inner distributor openings, such as the first selection of inner distributor openings 63*a* and the second selection of inner distributor openings 63*b* shown in FIG. 7, each selection allowing a different melt to pass to the next thin annular disk. In other embodiments of this invention (not shown) distribution disk 36 may include more than two selections of inner distributor openings 63. Inner distributor openings 63 and distribution outlet openings 56 may be arranged parallel to a circumference 61 of the distribution disk 36. Each selection of inner distributor openings may include eight inner distributor openings 63, such as eight inner distributor openings 63*a* shown in FIGS. 6 and 7 (collectively 63*x*) and eight inner distributor openings 63*b* shown in FIG. 7 (collectively 63*y*). Other embodiments of a distribution disk according to this invention may include selections having less or more than eight inner distributor openings. When used together in a cell, number of inner distributor openings in each selection 63*x* and 63*y* of inner distributor openings desirably corresponds to the number of distribution outlet openings 56, the number of inner openings 71*a*, 71*b* in a selection of inner openings 71*x*, 71*y* of a spreader disk 38 (FIG. 10), the number of inner passage openings 68*a*, 68*b* in a selection of inner passage openings 68*x*, 68*y* of a repeater disk 40 (FIG. 11) and/or the number of inner flow openings 65 of a second cap disk 34 (FIG. 5). These selections of inner passages and/or openings, when aligned, create flow paths for one melt within the layer sequence repeater module of this invention. According to certain embodiments of this invention, each melt, once distributed, has eight flow paths within the layer sequence repeater module. Other embodiments of this invention may have more or less than eight flow paths for each distributed melt.

In one embodiment (FIG. 12), the second cap disk 34 is axially adjacent to the distribution disk 36. The second cap disk 34 includes at least one outer flow opening 64 and a plurality of inner flow openings 65 (FIG. 5). In one embodiment, the second cap disk 34 includes a plurality of outer flow openings 64 radially disposed along the circumference 67 of the second cap disk 34 and a plurality of concentric inner flow openings 65. The outer flow openings 64 preferably correspond with and/or are axially aligned with one or more outer distributor openings 62 of the distribution disk 36, which, in turn correspond to and/or are axially aligned with one or more entry openings 33 of the first cap disk 32, as previously described. The second cap disk 34 includes inner flow openings 65 which are axially aligned with the respective distribution outlet openings 56 of distribution disk 36. The second cap disk 34 is preferably designed to direct the selected resin stream to the next thin annular disk of the layer sequence repeater module 30. In addition, the second cap disk 34 also directs the unselected resin stream(s), flowing in one or more outer flow openings 64, to the next disk in the layer sequence repeater module. The second cap disk 34 may terminate a resin passage. The second cap disk 34 may include one or more termination points 31 replacing one or more outer flow openings 64.

In operation, the second cap disk 34 may direct a distributed melt, e.g., stream b, to the next disk via the inner flow openings 65. Alternatively, the second cap disk 34 may direct stream b to the next disk via an outer flow opening 64, which may be aligned with distribution inlet opening 54 of the distribution disk 36. Alternatively, second cap disk 34 may terminate the flow of stream b by having a termination point 31 aligned with distribution inlet opening 54 of the distribution disk 36. A termination point 31 will terminate the resin passage of stream b such that the flow of stream b will stop at the second cap disk 34. For example, as shown in FIG. 1, the second cap disk 34 in the third disk position includes a termination point 31 aligned with the distribution inlet opening 54 of the distribution disk 36, thus terminating the flow of stream a. The second cap disk 34 includes no termination point for stream c and directs the flow of stream c to the repeater disk 40, and also directs the flow of distributed stream c from the distribution disk 36.

Figure 8:
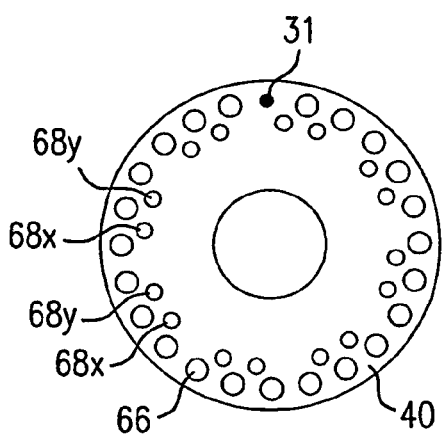
FIG. 8 is a top view of a repeater disk according to one embodiment of the present invention, including a termination point and two selections of inner passages.
Figure 9:
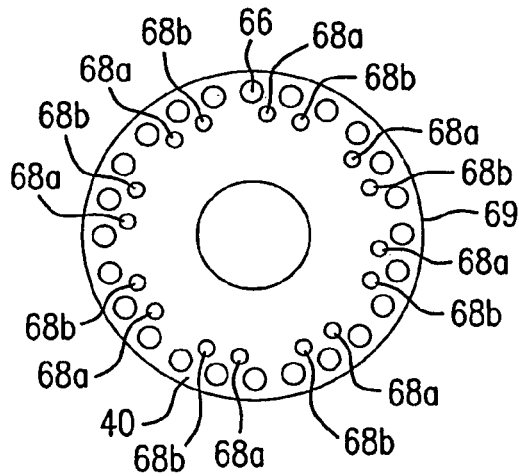
FIG. 9 is a top view of a repeater disk according to another embodiment of the present invention, including two selections of inner passages and no termination points.
Figure 11:
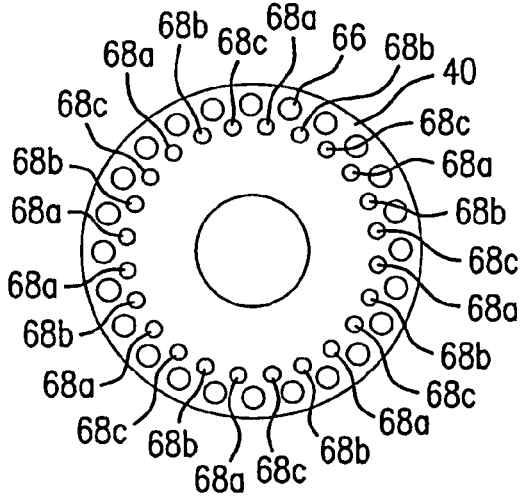
FIG. 11 is a top view of a repeater disk according to yet another embodiment of the present invention, including three selections of inner passages.

Referring to FIGS. 9 and 11, each repeater disk 40 desirably includes at least one and suitably a plurality of outer passages 66 disposed circumferentially along a periphery or circumference 69 of repeater disk 40 and a plurality of inner passages 68 illustrated as 68*a*, 68*b* and 68*c*, disposed inward of the plurality of outer passages 66. The plurality of inner passages 68 is disposed in a pattern that is concentric with the plurality of outer passages 66. The outer passages 66 can each be used to carry a melt stream up or down in the layer sequence repeater module until the melt stream reaches a distribution inlet opening 54 in a distribution disk 36 which divides the melt into a plurality of streams, suitably eight streams, positioned evenly around the distribution disk. Depending on the number of layers desired in the co-extruded film product, the number of outer passages 66 may be relatively small or large. Suitably, the repeater disk 40 includes at least about eight outer passages 66, or at least about 16 outer passages 66, or at least about 24 outer passages 66. The outer passages 66 may generally be spaced apart evenly around the circumference 69. One or more outer passages 66 may be replaced with a termination point 31 as shown in FIG. 8.

Figure 10:
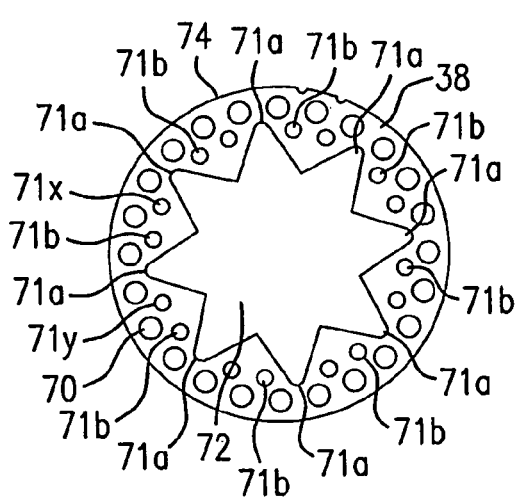
FIG. 10 is a top view of a spreader disk according to one embodiment of the present invention.

The plurality of inner passage openings 68 includes at least one selection of inner passage openings and preferably a plurality of selections of inner passage openings. Each selection of inner passage openings preferably accommodates a different melt stream. In one embodiment of this invention, the plurality of inner passage openings includes two selections of inner passage openings, such as a first selection of inner passage openings 68*a* and a second selection of inner passage openings 68*b*, as shown in FIG. 9. In another embodiment of this invention, the plurality of inner passage openings 68 includes three selections of inner passage openings, such as a first selection of inner passage openings 68*a*, a second selection of inner passage openings 68*b* and a third selection of inner passage openings 68*c*, as shown in FIG. 11. Each selection preferably directs the flow of one melt into the next thin annular disk. Each selection may have eight inner passage openings, such as selection 68*x* (representing eight inner passage openings 68*a*) and selection 68*y* (representing eight inner passage openings 68*b*), shown in FIG. 8. Consequently, two selections of inner passage openings may include a total of sixteen inner passage openings 68, as shown in FIG. 9, and three selections of inner passage openings may include a total of twenty-four inner passage openings 68, as shown in FIG. 10.

The repeater disk 40 may include one or more termination points 31 replacing one or more outer passage openings 66. The repeater disk 40 shown in FIG. 8 includes one termination point 31. One of the selections of inner passage openings 68a, 68b or 68c of the repeater disk 40 may be axially aligned with inner flow openings 64 of the second cap disk 34.

Each repeater disk 40 may have an axial thickness (not shown) of less than about 0.1 inches, preferably less than about 0.07 inches, and most preferably, less than about 0.05 inches. In one embodiment of this invention, one or more repeater disks 40 have an axial thickness of about 0.033 inches.

The spreader disk 38 includes at least one and preferably a plurality of outer openings 70 radially disposed along a circumference 74 of the spreader disk 38. The one or more outer openings 70 are axially aligned with one or more respective outer passage openings 66 of repeater disk 40, outer flow openings 64 of second cap disk 34, outer distributor openings 62 and/or distribution inlet opening 54 of the distribution disk 36 and/or entry openings 33 of the first cap disk 32. The spreader disk 38 additionally includes a plurality of inner openings 71, including a plurality of selections of inner openings. For example, in one embodiment, the spreader disk 38 includes two selections of inner openings 71, such as a first selection of inner openings 71a and a second selection of inner openings 71b shown in FIG. 10. At least one selection of inner openings 71 is desirably axially aligned with the respective selection of inner passage openings 68 of repeater disk 40, inner flow openings 65 of the second cap disk 34 (FIG. 5), distribution outlet openings 56 of the distribution disk 36 and/or a selection of inner distributor openings 63 of the distribution disk 36.

Referring to FIG. 10, the spreader disk 38 further includes a flow region 72. The flow region 72 is shown in FIG. 10 to have a configuration of an eight-point star. The flow region 72 is connected to a first selection of inner openings 71a, which are the eight points of the eight-point star. In FIG. 10, the illustrated flow region 72 is a cavity that extends through the entire axial thickness of the spreader disk 38. The spreader disk 38 is designed to receive the selected melt from the inner flow openings 65 of the second cap disk 34 (FIG. 5), inner passage openings 68 of the repeater disk 40 (FIG. 11), distribution outlet openings 56 of the distribution disk 36 and/or inner distributor openings 63 of the distribution disk 36 (FIGS. 6 and 7), allow the selected melt to fill the flow region 72 of spreader disk 38 and direct the selected melt to an annular passage 75 (shown in FIG. 12) of the die to form a multi-layer product.

Each spreader disk 38 may have an axial thickness (not shown) of less than about 0.1 inches, more preferably less than about 0.05 inches, and most preferably less than about 0.02 inches. In one embodiment of this invention, one or more spreader disks 38 have an axial thickness of about 0.016 inches.

The inclusion of repeater disks 40 in one or more cells of the layer sequence repeater module enables what was previously a single melt stream forming a single layer, to be divided into multiple smaller melt streams forming multiple thinner layers in the product. Without the repeater disks, a single cell would typically be capable of forming only a single layer, and would typically include a first cap disk 32, a distribution disk 36, a second cap disk 34, a spreader disk 38, and a third cap disk 32, similar to the arrangement described in U.S. Pat. No. 5,762,971. In order to make a film having multiple layers, multiple cells (each including a similar arrangement of disks) would be stacked together. The inclusion of repeater disks 40 enables multiple layers to be formed from a single cell, and allows the layers to be thinner. As shown in FIG. 1, for instance, and described further below, a sequence of repeater disk 40, followed by spreader disk 38, repeater disk 40, spreader disk 38 and so on, can be repeated several times within a single layer sequence repeater module or cell 30 to make multiple nano-layers of controlled nano-scale thicknesses. If desired, multiple cells 30 can also be stacked together to greatly enlarge the number of layers in the co-extruded product.

The disks described above are arranged to form the layer sequence repeater module 30 of the present invention. One possible arrangement of disks is shown in FIG. 1. Another possible arrangement of disks forming the layer sequence repeater module of this invention is shown in FIG. 3.

In one embodiment, the layer sequence repeater module 30 includes a plurality of thin annular disks arranged as shown in FIG. 1. As shown in FIG. 1, the layer sequence repeater module 30 includes, sequentially, a first distribution section 73x, a plurality of spreader disks 38 alternating with a plurality of repeater disks 40, and a second distribution section 73y. Spreader disks 38 alternate with repeater disks 40 such that each spreader disk 38 is desirably sandwiched between two repeater disks 40. Each distribution section 73x, 73y includes a distribution disk 36. The distribution disk 36 may be sandwiched between a first cap disk 32 and a second cap disk 34, as shown in FIG. 1. In the embodiment shown in FIG. 1, the layer sequence repeater module 30 includes a first distribution section 73x, seven spreader disks 38, eight repeater disks 40, and a second distribution section 73y.

The layer sequence repeater module 30 of this invention may include any number of spreader disks 38 alternating with repeater disks 40, depending on need. For example, if a seven nano-layer product is desired, the layer sequence repeater module 30 may include seven spreader disks 38, alternating with repeater disks 40. If a twenty-one nano-layer product is desired, the layer sequence repeater module 30 may include twenty-one spreader disks 38, alternating with repeater disks 40.

The layer sequence repeater module 30 of this invention may include one or more distribution sections 73 and/or distribution disks 36, depending on need. For example, in order to make a multi-layer product from two melts, the layer sequence repeater module 30 will desirably include two distribution sections 73 or, alternatively, two distribution disks 36. In order to make a multi-layer product from three melts, the layer sequence repeater module 30 will desirably include three distribution sections 73 or, alternatively, three distribution disks 36. In order to make a multi-layer product from four or more melts, the layer sequence repeater module will desirably have the corresponding number of distribution sections 73 and/or distribution disks 36. Alternatively, one or more melts may be distributed within the annular die before entering the layer sequence repeater module 30.

As briefly described above, the layer sequence repeater module 30 may have one or more distribution sections 73. Each distribution section 73 includes a distribution disk 36. In one embodiment, the distribution section 73, such as the distribution section 73x shown in FIG. 1, includes a distribution disk 36 sandwiched between a first cap disk 32 and a second cap disk 34. In another embodiment, the distribution section 73, such as the distribution section 73z shown in FIG. 3, includes a distribution disk 36 sandwiched between a second cap disk 34 and a repeater disk 40. Alternatively (not shown), the distribution disk 36 may be sandwiched between a first cap disk 32 and a repeater disk 40, or two repeater disks 40.

Distribution sections 73x and 73z shown in FIGS. 1 and 3 are forward distribution sections. Forward distribution sections distribute and direct the flow of a melt in a forward direction extending from the entry end to the exit end of the layer sequence repeater module 30. Distribution sections 73y shown in FIGS. 1 and 3 are reverse distribution sections. Reverse distribution sections distribute and direct the flow of a melt in a reverse direction extending from the exit end to the entry end of the layer sequence repeater module 30. The forward direction is opposite to the reverse direction within the layer sequence repeater module of this invention. Thus, in a sequence repeater module 30 including a forward distribution section and a reverse distribution section, at least two melts flow in opposite directions within the layer sequence repeater module 30. Other embodiments of the layer sequence repeater module of this invention may include only forward distribution section(s) or only reverse distribution section(s).

Another embodiment of the layer sequence repeater module 30 is shown in FIG. 3. In this embodiment, the layer sequence repeater module 30 includes three distribution sections 73x, 73z and 73y, each distributing one of three melts supplied into the layer sequence repeater module 30. The layer sequence repeater module 30 shown in FIG. 3 includes eleven spreader disks 38 alternating with repeater disks 40. The layer sequence repeater module 30 shown in FIG. 3, produces a multi-layer product including eleven layers. Each spreader disk 38 is positioned to capture and form a layer from one of the three melts a, b and c. The eight points of the eight-point star flow region 72 of the spreader disk 38 are positioned to capture the desired melt to form a layer.

The first distribution section 73x shown in FIGS. 1 and 3, positioned at a first end (i.e., the entry end) of the layer sequence repeater module 30, distributes a melt and directs a flow of the melt in a first direction. The second distribution section 73y shown in FIGS. 1 and 3, positioned at a second end (i.e., the exit end) of the layer sequence repeater module 30, distributes a melt and directs the flow of the melt in a second direction, where the second direction is opposite to the first direction within the layer sequence repeater module 30 of this invention. In another embodiment of this invention (not shown), the layer sequence repeater module includes distribution sections distributing and directing the flow of melts only in one direction. This single direction may be a first direction or a second direction.

The layer sequence repeater module 30 shown in FIG. 1, forms seven layers from resin streams a and c in the following order: c, a, c, a, c, a, c. The layer sequence repeater module 30 shown in FIG. 3, forms eleven layers from resin streams a, b and c in the following order: c, a, c, b, c, a, c, b, c, a, and c. Resin stream a is distributed by the distribution section 73x, resin stream b is distributed by the distribution section 73z and resin stream c is distributed by the distribution section 73y.

The disks making up the layer sequence repeater module 30 can be made of any material suitable for use in a co-extrusion die. Suitable materials include, for example, ceramic, plastic or metallic materials that can withstand a welded attachment or the clamping pressure of the securing means and that do not chemically or thermally react with the melts being processed. Preferably the disks comprise a material that facilitates easy and inexpensive manufacture of the disks themselves. A preferred disk may comprise, for example, metallic materials such as steel and aluminum. More preferably, each disk has smooth surfaces so that a surface from a disk intimately abuts a surface from an axially adjacent disk. Such intimate contact will ensure that melt streams flowing through the layer sequence repeater module are properly directed and without leaking. Where poor surface quality disks are being used it is preferable that the disks are secured together by glue or welds to reduce leaking.

The disks in the layer sequence layer repeater module can be secured by disk bolts (not shown). These bolts can be inserted in a plurality of unused melt holes such as those aligned with inlet openings, if available. Alternatively, dedicated holes (not shown) in each disk specifically made for the disk bolts can also be provided. However, these dedicated holes are preferably placed such that the disk bolts would not interfere with the melt flow, for example, in the channels in the distribution disk 36 or the flow region of the spreader disk. Also, other securing means, such as for example, glue, may be used. Each disk can be glued to the axially adjacent disks within the layer sequence repeater module. Any glue material suitable for securing the material making up the disks may be used so long as the processed melt streams do not chemically react with the glued materials. An example of acceptable glue material for metallic disks including steel and aluminum (specifically product number DK-175-022A), is an inorganic polymer ceramic glaze from Cerdec Corporation of Washington, Pa.

In one embodiment of this invention, certain disks or sets of disks within the layer sequence repeater may be permanently joined together. One such means of permanently joining disks within the layer sequence repeater together is with spot welds between abutting surfaces of adjacent disks. Specifically, a spreader disk and a repeater disk, or a repeater disk and two spreader disks on either side of the repeater disk may be connected with respect to each other with spot welds.

Other means of welding known to those having ordinary skill in the art, such as braze welding, may be used to join two or more disks within a cell. A preferred weld would render grinding disk surfaces smooth following placement of the weld.

In yet another preferred embodiment, certain disks or a group of two or more disks can be machined from a single piece of material. Like a welded group of disks, a single-piece machined cell creates a permanent connection among groups of disks.

The layer sequence repeater module can be used to produce multilayer films having large numbers of thin layers and superior orientation properties. The superior orientation is believed to result because the thin layers are gently aligned in the melt phase, with very little stress in the alignment. Each and every nanolayer surface is formed separately between two metal die surfaces separated by a minimal gap before the slow moving melt joins the common melt path within the annulus of the die. Overall, there is more melt surface to polymer contact throughout a melt cross section leaving a modular disk die with a layer sequence repeater module, than in a conventional die. Also each nanolayer generated has a high ratio of surface area to thickness. This condition requires a gentle, low stress melt alignment to avoid breakage in the individual nanolayers.

The gentle, low stress melt flow through the layer sequence repeater module is enabled by the fact that the melt flows through the layers in parallel, instead of in series. For example, an internal die gap for each nanolayer may be set at 0.017 inch (431 microns). To produce a 25-layer film from two polymers, the layer sequence repeater module would have 25 of these gaps, 13 for the first polymer and 13 for the second polymer. This means that each polymer would have an equivalent die gap exceeding 0.2 inch (12.5 mm), specifically 0.017 inch (431 microns)×13 for the first polymer and 0.017 inch (431 microns)×12 for the second polymer. This is very large compared to the normal 0.030-0.060 inch (762-1524 microns) die gap for a single film layer in a conventional die. Thus, compared to a conventional die, the polymer flow through the layer sequence repeater module is comparatively slow and gentle, due to the parallel flow arrangement. The flow remains parallel until all of the layers are joined together at the central opening 49 defined by the inner radius 48 of the thin annular disks.

The gentle, low stress melt flow through the layer sequence repeater module results in a gentle alignment of molecules. This allows for greater stretching during subsequent uniaxial or biaxial orientation because more alignment and stretching of molecules occurs during the stretching process than would typically be the case with films made from conventional extrusion processes. The greater stretching during orientation can result in improved properties, such as tensile strength and puncture resistance. The nanolayer films also exhibit improved thermoforming, because thermoforming and orientation require similar stretching processes.

Various conventional processes can be used to orient the multilayer films prepared using the layer sequence repeater module, to obtain nanolayer oriented films. The quickest way is to stretch orient the film as it is being blown and is cooling. This generally creates oriented shrink films with low shrink force.

A double bubble process can also be used. A first blown film bubble is produced, then cooled and quenched, then reheated and stretched in a trapped air second bubble. This process involves colder biaxial stretching that results in higher shrink force and higher tensile strength films.

A tenter frame process can also be used to heat and stretch the film. The multilayer film can be blown, collapsed and slit to form flat tape. The flat tape is then heated and stretched (uniaxially or biaxially) using the tenter frame.

Other advantages and characteristics of the present invention are illustrated in the following examples.

EXAMPLES

A layer sequence repeater module was assembled and inserted into an annular die, as shown in FIG. 12. Two conventional cells 20, each including the arrangement described in Table 1 of a first cap disk 32, a distribution disk 36, two second cap disks 34, a spreader disk 38, and a third cap disk 32, were positioned on each side of the layer sequence repeater module 30. The layer sequence module 30 included a cap disk 32, a distribution disk 36, and another cap disk 34 on both sides, sandwiching an alternating sequence of spreader disks 38 and repeater disks 40, as described in Table 1. Melt materials were delivered from four extruders A, B, C and D (not shown). Materials from extruders B and C were delivered to and distributed by the layer sequence repeater module to form twenty-one nano-layers. Materials from extruders A and D were delivered to and distributed by the two conventional cells 20 on both sides of the layer sequence repeater module. The assembled modular die consisted of the following modules in the following order: a cell 20 producing a layer from extruder-A-material, a cell 20 producing a layer from extruder-D-material, the layer sequence repeater module 30, a cell 20 producing a layer from extruder-D-material, and a cell producing a layer from extruder-A-material. The listing of modules and disks in each module is provided in Table 1 below. Cells forming layers from materials from extruders A and D (i.e., two cells at each end of the layer sequence repeater module) produced standard micro-layers, and the layer sequence repeater module produced nano-layers from materials from extruders B and C. The nano-layers were sandwiched between two micro-layers on either side thereof. The twenty-one nano-layers had the following structure: c/b/c/b/c/b/c/b/c/b/c/b/c/b/c/b/c/b/c/b/c, where b was the material from extruder B and c was the material from extruder C. The total film structure, including the two micro-layers on each side of the twenty-one nano-layers had the following structure: a/d/c/b/c/b/c/b/c/b/c/b/c/b/c/b/c/b/c/b/c/b/c/d/a, where a was the material from extruder A and d was the material from extruder D.

A 2-inch die and a four-extruder downward co-extrusion line were utilized.

Extruders A and D had a 1.25-inch diameter, and 22:1 L/D steel screws with a chopper mixing tip and a breaker plate and a compression ratio of 3:1. Extruder A was driven by a 3 HP AC Vari-drive.

Two satellite ¾-inch extruders B and C were on a common drive with extruder A. Extruders B and C delivered resin at about a total of 40% of extruder A. Extruders B and C had a ¾-inch diameter, and 28:1 L/D steel screws with a chopper mixing tip and no breaker plate and a compression ratio of 3:1.

The expected layer thickness values are summarized below with extruder A delivering at 40 rpm, extruders B and C each delivering at 20% of extruder A, and extruder D delivering at 30 rpm or 20% of A×30/40.

Relative Output A=40 0.5×40=20 each layer

Relative Output D=0.2×40×0.75=6 0.5×6=3 each layer

Relative Output C=0.2×40=8 8/11=0.73 each layer

Relative Output B=0.2×40=8 8/10=0.80 each layer

Total=40+6+8+8=62

LAYER THICKENESS BASED ON 10 MIL (25.4 MICRON) FILM

Each of layers a (2 total layers a)=10×20/62=3.23 mil (82 microns)

Each of layers d (2 total layers d)=10×3/62=0.48 mil (12.2 microns)

Each of layers c (11 total layers c)=0.73/62=0.012 mil (305 nanometers)

Each of layers b (10 total layers b)=0.8/62=0.012 mil (305 microns)

Thick tubing was drawn slowly from the die and set aside to cool. The thick tubing was then cut with a hacksaw and shaved with a razor. Under a 10 times magnifier, about ⅓ of the thickness of the tubing consisted of two micro-layers formed from materials a and d, another ⅓ of the thickness of the tubing consisted of twenty-one nano-layers, and the final ⅓ of the thickness of the tubing consisted again of two micro-layers formed from materials d and a. The product samples are shown in FIGS. 13-15.

TABLE 1

| Module | Disks |
|---|---|
| Cell A (Exit) | .063" first cap disk (Exit) |
|  | .063" spreader disk |
|  | .063" second cap disk |
|  | .250" second cap disk |
|  | .250" distribution disk |
|  | .250" first cap disk |
| Cell D | .063" first cap disk |
|  | .063" spreader disk |
|  | .063" second cap disk |
|  | .250" second cap disk |
|  | .250" distribution disk |
|  | .250" first cap disk |
|  | .500" spacer disk with melt holes |

TABLE 1-continued

| Module | Disks |
|---|---|
| Layer Sequence Repeater | .250" first cap disk |
| | .250" distribution disk |
| | .250" second cap disk |
| | 21-layer c/b sequence repeater disk unit |
| | (.033" repeater disk and .016" spreader disk/layer) |
| | .125" second cap disk |
| | .250" distribution disk |
| | .125" first cap disk |
| Cell D | .063" first cap disk |
| | .063" spreader disk |
| | .063" second cap disk |
| | .250" second cap disk (through) |
| | .250" distribution disk |
| | .250" first cap disk |
| Cell A (Entry) | .250" first cap disk (through) |
| | .250" distribution disk |
| | .250" second cap disk (through) |
| | .063" second cap disk |
| | .063" spreader disk |
| | .063" first cap disk (Entry) |

With reference to Tables 2-7 below, references to Materials A-J are made to the following Resins A-J, respectively:

Resin A=Dow 6411, a low density polyethylene of about 2 MI obtained from Dow Plastics;

Resin B=Topas® 8007, a cyclic olefin copolymer (COC) available from Polyplastics Co., Ltd.;

Resin C=Rexene® 204 (E4.5% VA 2MI) obtained from Rexene Corporation;

Resin D=DOW LDPE 4012, a low density polyethylene of about 10 MI available from Dow Plastics;

Resin E=Vistamaxx™ 6100, a propylene-ethylene polymer available from ExxonMobil Chemical Company Resin F=Milliken® 3276 HPP, a clarified test resin obtained from Milliken Chemical;

Resin G=Clyrell RC 1314, a polypropylene random copolymer available from LyondellBassell Industries;

Resin H=960 HDPE Pactiv, a high density polyethylene of about 5 MI, obtained from Pactiv Corporation;

Resin I=EVAL® L171B, an ethylene vinyl alcohol (EVOH) available from Eval Company of America; and Resin J=ADMER® NF498A, a polyethylene adhesive resin available from Mitsui Chemicals America, Inc.

Example 1

Samples were prepared under extrusion conditions summarized in Table 2 below.

TABLE 2

| Extruder B: | | | | | | | |
|---|---|---|---|---|---|---|---|
| Forward Barrel (° F.): | 410 | — | 400 | 400 | 400 | 400 | 400 |
| Rear Barrel (° F.): | 320 | — | 350 | 340 | 340 | 350 | 360 |
| Screw (RPM): | — | — | — | — | — | — | — |
| Hopper Cooling: | yes | yes | yes | yes | yes | yes | yes |
| Material: | A | C | C | A | A | D | A |
| Extruder A: | | | | | | | |
| Extension (° F.): | 400 | 400 | 400 | 400 | 400 | 400 | 400 |
| Forward Barrel (° F.): | 380 | — | 360 | 370 | 360 | 360 | 360 |
| Mid Barrel (° F.): | 340 | — | 300 | 300 | 300 | 290 | 300 |
| Rear Barrel (° F.): | 320 | — | 280 | 280 | 280 | 270 | 280 |
| Screw (RPM): | 30 | 30 | 40 | 40 | 40 | 40 | 40 |
| Hopper Cooling: | yes | yes | yes | yes | yes | yes | yes |
| Material: | A | A | C | C | A | A | A |
| Extruder C: | | | | | | | |
| Forward Barrel (° F.): | 390 | — | 390 | 390 | 380 | 420 | 420 |
| Rear Barrel (° F.): | 340 | — | 330 | 330 | 330 | 380 | 380 |
| Screw (RPM): | — | — | — | — | — | — | — |
| Hopper Cooling: | yes | yes | yes | yes | yes | yes | yes |
| Material: | B | B | B | B | B | B | B |
| Extruder D: | | | | | | | |
| Extension (° F.): | — | — | — | — | — | — | — |
| Forward Barrel (° F.): | 380 | — | 380 | 380 | 380 | 380 | 380 |
| Rear Barrel (° F.): | 340 | — | 330 | 340 | 340 | 340 | 350 |
| Screw (RPM): | — | — | — | — | — | — | — |
| Hopper Cooling: | yes | yes | yes | yes | yes | yes | yes |
| Material: | A | A | C | C | A | A | A |
| Die Module (° F.): | 380 | — | 379 | 380 | 378 | 379 | 380 |
| Die manifold (° F.): | 363 | — | 361 | 361 | 360 | 361 | 361 |
| Die exit (° F.): | 375 | — | 354 | 354 | 354 | 354 | 354 |
| Cooling Air setting (0-240): | 180 | 180 | 210 | 210 | 210 | 210 | 210 |
| Roll speed control setting (0-100): | 25 | 25 | 40 | 40 | 40 | 40 | 40 |
| Winder speed (fpm): | | | | | | | |
| Film width (inches): | 5-6 | 5-6 | 5-6 | 5-6 | 5-6 | 5-6 | 5-6 |
| Sample I.D: | 7-1; 7-2 | 7-3; 7-4 | 7-5 | 7-6 | 7-7 | 7-8 | 7-9 |

Samples 7-1 and 7-2 had the following structure: Resin A/Resin A/Resin B/Resin A/ . . . (alternating Resins A and B) . . . /Resin A/Resin B/Resin A/Resin A. A thick 10 mil tubing was prepared to clearly see the nano-layers in a cross section. Slight melt instability was observed.

Sample 7-5 was prepared to determine if resin viscosity changes would improve the thick film quality. The output of extruder A was increased to 40 rpm to make 15 mil tubing. Sample 7-5 had the following structure: Resin C/Resin C/Resin B/Resin C . . . (alternating Resins B and C) . . . . Resin C/Resin B/Resin C/Resin C. It was observed that substituting a 10 MI resin with a 2 MI resin increased melt instability.

Sample 7-6 had the following structure: Resin C/Resin C/Resin B/Resin A . . . (alternating Resins A and B) . . . . Resin A/Resin B/Resin C/Resin C. It was observed that by adding the 10 MI resin back into the twenty-one nano-layer layer sequence repeater improved the film quality. However, some melt instability was still present.

Sample 7-7 had the following structure: Resin A/Resin A/Resin B/Resin A . . . (alternating Resins A and B) . . . . Resin A/Resin B/Resin A/Resin A. It was observed that the quality of film was very good and slightly better as compared with sample 7-1. However, traces of melt instability were still observed.

Sample 7-8 had the following structure: Resin A/Resin A/Resin B/Resin D/ . . . (alternating Resins B and D) . . . /Resin D/Resin B/Resin A/Resin A. It was observed that the quality of sample 7-8 was worse than sample 7-7.

Sample 7-9 had the same structure as samples 7-1 and 7-7, but the melt delivery temperature of Resin B was raised. It was observed that raising the melt delivery temperature of Resin B improved the film quality further with only the slightest traces of melt instability.

Example 2

Samples were prepared under extrusion conditions summarized in Table 3 below.

TABLE 3

| Extruder B: | | | | | | |
|---|---|---|---|---|---|---|
| Forward Barrel (° F.): | 410 | 410 | 410 | — | 400 | — |
| Rear Barrel (° F.): | 350 | 380 | 380 | — | 390 | — |
| Screw (RPM): | — | — | — | — | — | — |
| Hopper Cooling: | yes | yes | yes | yes | yes | yes |
| Material: | A | B | B | B | B | B |
| Extruder A: | | | | | | |
| Extension (° F.): | 400 | 400 | 400 | 400 | 400 | 400 |
| Forward Barrel (° F.): | 380 | 370 | 370 | — | 370 | — |
| Mid Barrel (° F.): | 340 | 300 | 300 | — | 300 | — |
| Rear Barrel (° F.): | 320 | 280 | 280 | — | 280 | — |
| Screw (RPM): | 40 | 40 | 40 | 40 | 40 | 40 |
| Hopper Cooling: | yes | yes | yes | yes | yes | yes |
| Material: | A | A | A | A | A | A |
| Extruder C: | | | | | | |
| Forward Barrel (° F.): | 420 | 410 | 410 | — | 420 | — |
| Rear Barrel (° F.): | 380 | 390 | 390 | — | 390 | — |
| Screw (RPM): | — | — | — | — | — | — |
| Hopper Cooling: | yes | yes | yes | yes | yes | yes |
| Material: | A | A | A | A | A | A |
| Extruder D: | | | | | | |
| Forward Barrel (° F.): | 380 | 380 | 380 | — | 380 | — |
| Rear Barrel (° F.): | 350 | 350 | 350 | — | 340 | — |
| Screw (RPM): | 30 | 30 | 30 | 30 | 30 | 30 |
| Hopper Cooling: | yes | yes | yes | yes | yes | yes |
| Material: | A | A | A | A | A | E |
| Die manifold (° F.): | 368 | 361 | 361 | — | 368 | — |
| Die module (° F.): | 378 | 377 | 377 | — | 377 | — |
| Die exit (° F.): | 358 | 354 | 354 | — | 353 | — |
| Cooling Air setting (0-240): | 220 | 220 | 220 | 220 | 220 | 220 |
| Roll speed control setting (0-100): | 30 | 30 | 100 | 70 | 50 | 50 |
| Winder speed (fpm): | | | | | | |
| Film width (inches): | | | | | | |
| Sample I.D: | — | 7-10; 7-11 | 7-12 | 7-13 | 7-14 | 7-15 |

Further samples were prepared under extrusion conditions summarized in Table 4 below.

TABLE 4

| Extruder B: | | | |
|---|---|---|---|
| Forward Barrel (° F.): | 400 | 400 | 390 |
| Rear Barrel (° F.): | 390 | 380 | 380 |
| Screw (RPM): | — | — | — |
| Hopper Cooling: | yes | yes | yes |
| Material: | B | B | B |
| Extruder A: | | | |
| Extension (° F.): | 400 | 400 | 400 |
| Forward Barrel (° F.): | 420 | 410 | 410 |
| Mid Barrel (° F.): | 350 | 340 | 340 |
| Rear Barrel (° F.): | 330 | 340 | 340 |
| Screw (RPM): | 40 | 40 | 40 |
| Hopper Cooling: | yes | yes | yes |
| Material: | F | G | G |
| Extruder C: | | | |
| Forward Barrel (° F.): | 410 | 410 | 420 |
| Rear Barrel (° F.): | 390 | 390 | 380 |
| Screw (RPM): | — | — | — |
| Hopper Cooling: | yes | yes | yes |
| Material: | A | A | H |
| Extruder D: | | | |
| Forward Barrel (° F.): | 380 | 380 | 380 |
| Rear Barrel (° F.): | 340 | 340 | 350 |
| Screw (RPM): | 30 | 30 | 30 |
| Hopper Cooling: | yes | yes | yes |
| Material: | E | E | E |
| Die manifold (° F.): | 368 | 370 | 370 |
| Die module (° F.): | 377 | 397 | 395 |
| Die exit (° F.): | 357 | 395 | 396 |
| Cooling Air setting (0-240): | 220 | 220 | 220 |
| Roll speed control setting (0-100): | 50 | 50 | 50 |
| Winder speed (fpm): | | | |
| Film width (inches): | | | |
| Sample I.D: | 7-16 | 7-17 | 7-18; 7-19 |

The run started with the initial extrusion conditions shown in the first column of Table 3 above and then immediately progressed to the next set of extrusion conditions shown in the second column of Table 3 above. Resin B was used in extruder B. A sample of a very thick melt was collected and shaven with a razor in order to see the twenty-one nano-layers. The nano-layers were visible under a 10 times magnifier and occupied about ⅓ of the total structure. Samples 7-10 and 7-11 were collected.

The speed of the pinch rolls was increased to a setting of 100, and sample 7-12 was collected. The speed of the pinch rolls was reduced to a setting of 70, and sample 7-13 was collected. The speed of the pinch rolls was further reduced to a setting of 50, and sample 7-14 was collected. It was observed that all samples were of good quality. Resin E was then fed to extruder D, and sample 7-15 was collected. Again it was observed that the film quality was good.

Next, polypropylene (PP) was added to extruder A. With reference to Table 4, the first resin tried was Resin F. Severe melt instability was observed, and sample 7-16 was collected. The second resin tried was Resin G in extruder A. Although melt stability generally improved, some melt instability was still observed. Sample 7-17 was collected. The third resin tried was Resin H in extruder C. It was observed that the resulting melt was a much better quality melt. Samples 7-18 and 7-19 were collected.

With reference to Examples 1 and 2, it was found that Resin A and H co-extruded with Resin B were the only polyethylene melts relatively free from melt instability. Resin G used with Resin E as the adhesive resulted in good melt stability.

Example 3

Samples were prepared under extrusion conditions summarized in Table 5 below.

TABLE 5

| Extruder B: | | | | | | | |
|---|---|---|---|---|---|---|---|
| Forward Barrel (° F.): | 410 | 400 | 400 | 410 | 400 | 400 | 400 |
| Rear Barrel (° F.): | 410 | 400 | 390 | 390 | 400 | 400 | 400 |
| Screw (RPM): | — | — | — | — | — | — | — |
| Hopper Cooling: | yes | yes | yes | yes | yes | yes | yes |
| Material: | I | I | I | I | I | I | I |
| Extruder A: | | | | | | | |
| Extension (° F.): | 440 | 440 | 440 | 440 | 440 | 440 | 440 |
| Forward Barrel (° F.): | 430 | 420 | 420 | 420 | 420 | 420 | 420 |
| Mid Barrel (° F.): | 350 | 350 | 350 | 360 | 360 | 350 | 350 |
| Rear Barrel (° F.): | 310 | 310 | 310 | 310 | 310 | 310 | 300 |

TABLE 5-continued

| | | | | | | | |
|---|---|---|---|---|---|---|---|
| Screw (RPM): | 40 | 40 | 40 | 40 | 40 | 40 | 40 |
| Hopper Cooling: | yes | yes | yes | yes | yes | yes | yes |
| Material: | A | A | A | A | A | A | A |
| Extruder C: | | | | | | | |
| Forward Barrel (° F.): | 410 | 410 | 420 | 410 | 400 | 400 | 400 |
| Rear Barrel (° F.): | 410 | 390 | 390 | 390 | 390 | 400 | 400 |
| Screw (RPM): | — | — | — | — | — | — | — |
| Hopper Cooling: | yes | yes | yes | yes | yes | yes | yes |
| Material: | J | J | J | J | J | J | J |
| Extruder D: | | | | | | | |
| Forward Barrel (° F.): | 390 | 380 | 380 | 390 | 380 | 380 | 390 |
| Rear Barrel (° F.): | 350 | 340 | 340 | 340 | 340 | 340 | 340 |
| Screw (RPM): | — | — | — | — | — | — | — |
| Hopper Cooling: | yes | yes | yes | yes | yes | yes | yes |
| Material: | E | E | E | E | E | E | E |
| Die manifold (° F.): | 382 | 384 | 385 | 385 | 386 | 386 | 386 |
| Die module (° F.): | 400 | 399 | 400 | 399 | 394 | 396 | 398 |
| Die exit (° F.): | 404 | 397 | 396 | 397 | 397 | 397 | 397 |
| Cooling Air setting (0-240): | 220 | 220 | 220 | 220 | 220 | 220 | 220 |
| Roll speed control setting (0-100): | 40 | 50 | 60 | 70 | 80 | 90 | 100 |
| Winder speed (fpm): | | | | | | | |
| Film width (inches): | | | | | | | |
| Sample I.D: | 8-1 | 8-2 | 8-3 | 8-4 | 8-5 | 8-6 | 8-7 |

The run started with oven dried Resin I in extruder B, Resin A in extruder A, Resin J in extruder C and Resin E in extruder D. Good melt stability was observed, and films ranging in thickness were produced and collected. Film thicknesses ranged from 6 mil in sample 8-1 to 1 mil in sample 8-7.

Example 4

Samples were prepared under extrusion conditions summarized in Table 6 below.

TABLE 6

| | | | | | |
|---|---|---|---|---|---|
| Extruder B: | | | | | |
| Forward Barrel (° F.): | 400 | 410 | 410 | 400 | 400 |
| Rear Barrel (° F.): | 400 | 390 | 390 | 390 | 390 |
| Screw (RPM): | — | — | — | — | — |
| Hopper Cooling: | yes | yes | yes | yes | yes |
| Material: | I | I | I | I | A |
| Extruder A: | | | | | |
| Extension (° F.): | 440 | 440 | 440 | 440 | 440 |
| Forward Barrel (° F.): | 420 | 420 | 420 | 420 | 420 |
| Mid Barrel (° F.): | 370 | 380 | 390 | 390 | 390 |
| Rear Barrel (° F.): | 340 | 350 | 350 | 350 | 360 |
| Screw (RPM): | 40 | 40 | 40 | 40 | 40 |
| Hopper Cooling: | yes | yes | yes | yes | yes |
| Material: | G | G | G | G | G |
| Extruder C: | | | | | |
| Forward Barrel (° F.): | 420 | 410 | 410 | 410 | 410 |
| Rear Barrel (° F.): | 390 | 390 | 390 | 390 | 390 |
| Screw (RPM): | — | — | — | — | — |
| Hopper Cooling: | yes | yes | yes | yes | yes |
| Material: | J | J | J | J | J |
| Extruder D: | | | | | |
| Forward Barrel (° F.): | 390 | 380 | 400 | 420 | 420 |
| Rear Barrel (° F.): | 350 | 350 | 350 | 370 | 370 |
| Screw (RPM): | 30 | 30 | 30 | 30 | 30 |
| Hopper Cooling: | yes | yes | yes | yes | yes |
| Material: | E | E | E | E | E |
| Die manifold (° F.): | 384 | 390 | 391 | 392 | 392 |
| Die module (° F.): | 399 | 400 | 400 | 400 | 400 |
| Die exit (° F.): | 397 | 412 | 413 | 412 | 412 |
| Cooling Air setting (0-240): | 220 | 220 | 220 | 220 | 220 |
| Roll speed control setting (0-100): | 40 | 40 | 50 | 50 | 50 |
| Winder speed (fpm): | | | | | |
| Film width (inches): | | | | | |
| Sample I.D: | 8-8 | 8-9 | 8-10 | 8-11 | 8-12* |

Clarified polypropylene (PP) was used in extruder A. Resin E was used in extruder D to act as an adhesive layer on both sides of the twenty-one nano-layer structure of alternating layers of Resin J and Resin I. Samples 8-8 through 8-11 were collected. Throughout the collection of samples 8-8 through 8-11, portions of the film showed melt instability regardless of the conditions as shown in Table 6 above. The melt instability disappeared as Resin I was flushed with Resin A from extruder B, indicating that the viscosity of Resin I should be made similar to the viscosity of Resin A in order to produce quality films from these materials. Birefringence from the light was observed on the side of the film having some melt instability. Clear film samples had a special sparkle also probably due to birefringence.

Example 5

Samples were prepared under extrusion conditions summarized in Table 7 below.

TABLE 7

| | | | | | |
|---|---|---|---|---|---|
| Extruder B: | | | | | |
| Forward Barrel (° F.): | 400 | 400 | 390 | 420 | 420 |
| Rear Barrel (° F.): | 390 | 390 | 390 | 390 | 390 |
| Screw (RPM): | — | — | — | — | — |
| Hopper Cooling: | yes | yes | yes | yes | yes |
| Material: | I | I | I | I | I |
| Extruder A: | | | | | |
| Extension (° F.): | 410 | 410 | 410 | 410 | 410 |
| Forward Barrel (° F.): | 410 | 410 | 410 | 410 | 410 |
| Mid Barrel (° F.): | 370 | 370 | 370 | 370 | 370 |
| Rear Barrel (° F.): | 320 | 320 | 320 | 320 | 320 |
| Screw (RPM): | 40 | 40 | 40 | 40 | 40 |
| Hopper Cooling: | yes | yes | yes | yes | yes |
| Material: | A | A | A | A | A |
| Extruder C: | | | | | |
| Forward Barrel (° F.): | 410 | 410 | 410 | 410 | 420 |
| Rear Barrel (° F.): | 390 | 390 | 380 | 390 | 390 |
| Screw (RPM): | — | — | — | — | — |
| Hopper Cooling: | yes | yes | yes | yes | yes |
| Material: | J | J | J | J | J |
| Extruder D: | | | | | |
| Forward Barrel (° F.): | 390 | 390 | 390 | 380 | 380 |
| Rear Barrel (° F.): | 340 | 340 | 340 | 340 | 340 |
| Screw (RPM): | 30 | 30 | 30 | 30 | 30 |
| Hopper Cooling: | yes | yes | yes | yes | yes |
| Material: | A | A | A | A | A |
| Die manifold (° F.): | 369 | 368 | 368 | 368 | 368 |
| Die module (° F.): | 378 | 378 | 378 | 377 | 377 |
| Die exit (° F.): | 361 | 357 | 358 | 353 | 353 |
| Cooling Air setting (0-240): | 220 | 220 | 220 | 220 | 220 |
| Roll speed control setting (0-100): | 30 | 30 | 30 | 30 | 30 |
| Winder speed (fpm): | | | 5.25 | | |
| Film width (inches): | 4 | 4.5 | 4.5 | 4.7 | 4.7 |
| Sample I.D: | 8-13 | 8-14 | 8-15 | 8-16 | 8-17 |

Thick 12-15 mil EVOH tubing was made. Samples 8-13 through 8-17 were all very similar.

With reference to Examples 3-5, films of excellent co-extrusion stability having the following structure: polyethylene (PE)/Resin E/Resin J/Resin I . . . (alternating Resins I and J) . . . . Resin I/Resin J/Resin E/polyethylene (PE) were blown into films ranging in thickness from 5 mil to 1 mil. PE was then replaced with clarified PP to make clear films. Some melt instability was observed on one side of the bubble. The melt instability disappeared when Resin I was replaced with Resin A. A 12-15 mil film, similar to the first sample, was made in the final run. Birefringence was observed on the bubble with reflected light. The clear films had a brilliant sparkle to them. Since melt instability subsided when Resin A replaced Resin I, an EVOH with a melt viscosity similar to Resin A should make a better quality clear film.

Therefore, the layer sequence repeater module and/or a die including the layer sequence repeater module of the present invention has the ability to produce coextruded multi-layer products containing large numbers of layers (e.g. 21, 25, 51 and more) as well as products made up of large number of different materials. In one embodiment of this invention, a plurality of nano-layers are sandwiched between two or more micro-layers. The micro-layers may provide support and stability to the otherwise very thin nano-layers. The multi-layer products can be made of any melt material that can be extruded. Suitable materials include, for example, polyethylene ("PE"), polypropylene ("PP"), ethylene vinyl acetate ("EVA"), ethylene vinyl alcohol ("EVOH"), cyclic olefin copolymers ("COC"), and/or other thermoplastic materials as well as elastomer materials such as, for example, copolymers of alkenes having from 2 to about 30 carbons in the alkyl chain.

ADDITIONAL FILM STRUCTURES

The use of ethylene vinyl alcohol ("EVOH") to make thin nanolayer barrier films has led to the identification of a new crystal form of EVOH that is more deformable and has higher energy associated with it. The more deformable crystal structure has proven to be highly stretchable at a temperature just above its glass transition temperature (Tg) at 60° C. For example, EVOH in conventional barrier films can be about 0.3 mils (7.6 microns) thick. In a 25-layer nanofilm using EVOH for 12 of the layers, the same amount of EVOH can be split into layers having equal thickness of 635 nanometers. In another example, the total number of layers is increased to 77, with 38 of them being EVOH, and the film is stretch oriented to a total thickness of 0.026 mil (660 nm). In this example, the total amount of EVOH can be split into layers having equal thickness of 8.6 nanometers (with all 77 layers having the same thickness). A polyamide resin or a polyolefin-based adhesive can be used to form the remaining layers of the EVOH barrier film, and the entire nanolayer structure can be encapsulated between two outer layers of suitable polyethylene or other olefin polymer.

The following film structures have been produced using the layer sequence repeater module, and can be produced with or without variations.

Structure A

Film structure A, an oriented barrier film, includes a first outer layer of polyethylene, followed by a first tie (adhesive) layer, followed by 25 alternating layers of Nylon 6 (13 layers) and EVOH (12 layers), followed by a second tie layer and a second outer polyethylene layer. One or both outer polyethylene layers can be formed of a sealant material, such as a linear low density polyethylene or an ethylene vinyl acetate copolymer. The 25 nanolayers were produced as described above, using the layer sequence repeater module, with oriented layer thicknesses of 635 nm. The remaining layers were produced using conventional cells as described above with respect to FIG. 17.

Structure B

Film structure B, an oriented non-barrier microlayer shrink film, includes six layers of a first polyethylene, followed by thirteen alternating layers of second and third polyethylenes, followed by six additional layers of the first polyethylene, for a total of 25 layers. All 25 layers were microlayers produced using the layer sequence repeater module. Various types of polyethylene can be employed, including materials such as linear low density polyethylene and ethylene vinyl acetate, expecially for the outer layers. As explained above, the formation of microlayers in the layer sequence repeater module involves a gentler melt flow which brings the layers together under less stress. The resulting multilayer film has improved orientation and shrink properties compared to conventional shrink films having fewer and thicker layers.

Structure C

Film structure C is a vanation of Structure A, with a larger number of polyethylene microlayers and additional barrier layers on both sides of the nanolayer barrier bundle. Structure C, an oriented barrier film, includes an eight microlayer alternating sequence of polyethylene and adhesive (repeated four times), followed by a two-layer sequence of Nylon 6/66 and EVOH, followed by the 25 nanolayer sequence of Nylon 6 (13 layers) alternating with EVOH (12 layers), followed by an additional two-layer sequence of EVOH and Nylon 6/66, followed by an additional eight microlayer alternating sequence of adhesive and polyethylene (repeated four times). The first and second eight-layer sequences of polyethylene/adhesive can utilize the same or different polyethylenes and the same or different adhesive resins. The two-layer sequences of Nylon 6/66 and EVOH can be nanolayers or microlayers. The Film structure C can be made using one or more layer sequence repeater modules stacked together, or can be made with a middle layer sequence repeater module equipped for 25 layers, sandwiched between two modular disk coextrusion die modules, each equipped for 8 layers.

Structure D

Film structure D is an all nanolayer non-barrier oriented shrink film including 26 alternating layers of a second polyethylene (13 layers) and a first polyethylene (13 layers), followed by 25 alternating layers of the second polyethylene (13 layers) and the first polyethylene (12 layers), followed by 26 alternating layers of the first polyethylene (13 layers) and the second polyethylene (13 layers), for a total of 77 alternating polyethylene layers. The film structure can be made by stacking three layer sequence repeater module together, each equipped to produce 25 or 26 alternating layers. Various polyethylene resins (including without limitation linear low density polyethylene and ethylene vinyl acetate copolymers) can be used for optimal performance.

ADDITIONAL DIE STRUCTURES

Figure 16:
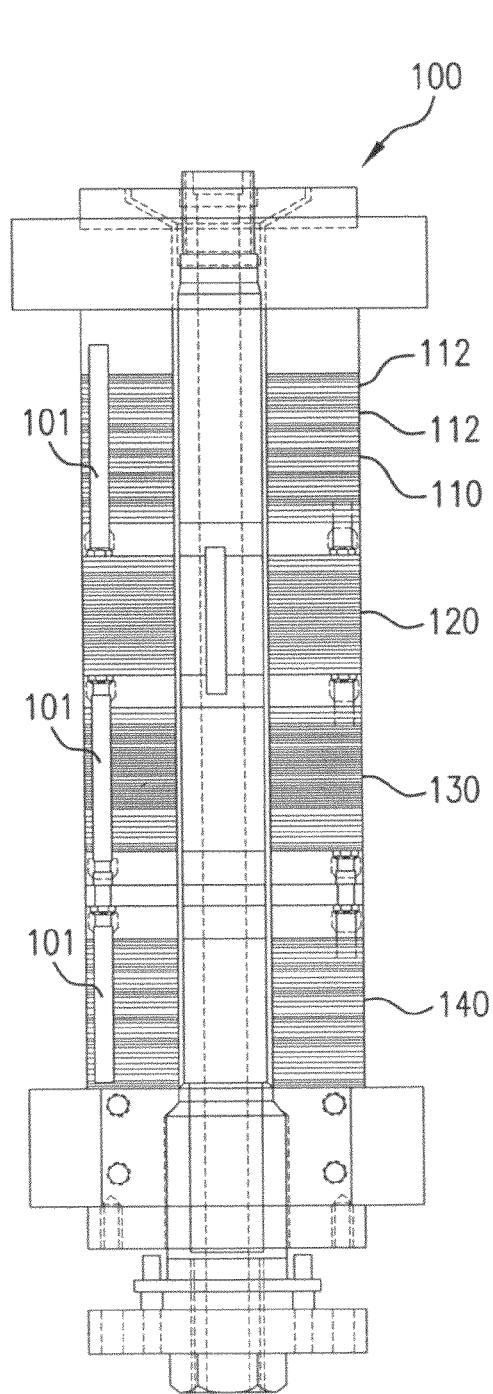
FIG. 16 is a cross-sectional view of a complex coextrusion die including two layer sequence repeater modules and two conventional modular disk coextrusion die modules.
Figure 17:
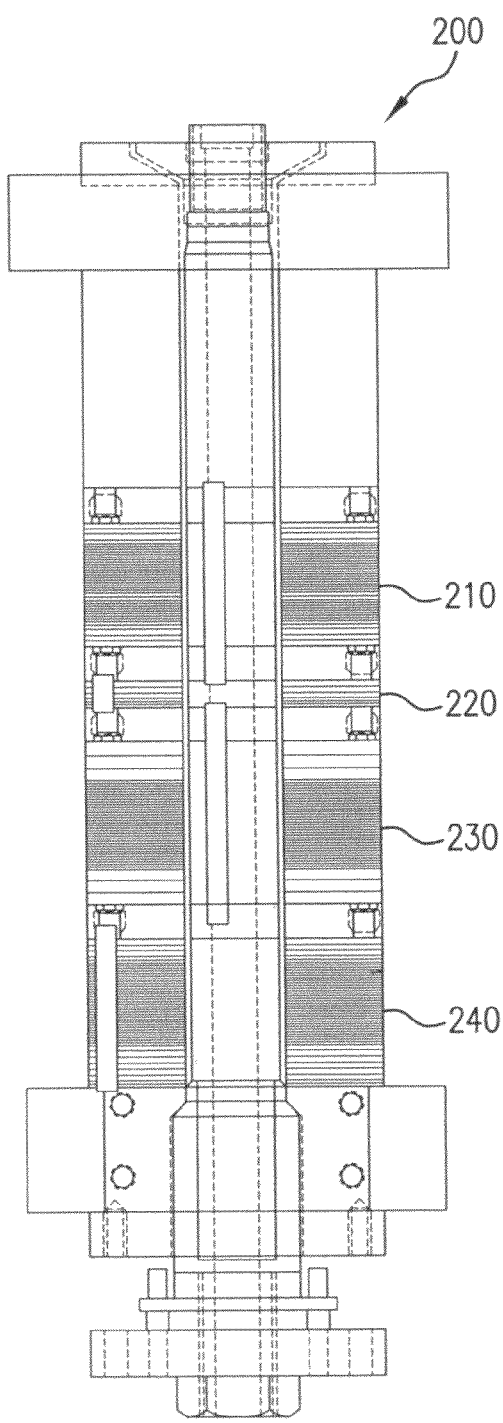
FIG. 17 is a cross-sectional view of a complex coextrusion die including four layer sequence repeater modules.

The layer sequence repeater module can also be used to assemble additional, more complex coextrusion die structures, including the nanolayer-producing die structures illustrated in FIGS. 16 and 17. Referring to FIG. 16, a complex die 100 includes modules 110, 120, 130 and 140 aligned and connected together using clamping bolts 101. Module 110 can be a conventional modular disk coextrusion die module capable of producing a plurality of microlayers, for example six microlayers in the embodiment shown, or any desired number of microlayers. Each microlayer is produced by a disk arrangement 112 including disk arrangements similar to those described in Table 1 for Cells A and D, except that the internal die gaps may vary according to the thickness of the disks, and may be 0.030 inch in the embodiment shown.

Module 120 is a layer sequence repeater module having a configuration similar to the layer sequence repeater module described in Table 1, except that the sequence of repeater disks and spreader disks can be varied to produce a larger or smaller number of nanolayers, for example 25 nanolayers in the embodiment shown, or any desired number of nanolayers. Again, the internal die gaps may vary according to the thickness of the individual disks, and may be 0.017 inch in the embodiment shown.

Module 130 is a layer sequence repeater module similar to module 120, except that the sequence of repeater disks and spreader disks may be varied to produce a larger or smaller number of nanolayers, and the internal die gaps may vary according to the thickness of the individual disks. In the embodiment shown, for example, the sequence of repeater disks and spreader disks can be varied to produce 2 nanolayers, and the internal die gaps may again be 0.017 inc. Module 140 is another conventional modular disk coextrusion die module capable of producing a plurality of microlayers, for example six microlayers in the embodiment shown, or any desired number of microlayers. The internal die gaps may also vary according to the disk thickness, and may be 0.030 in the embodiment shown.

In order to produce barrier films using complex die 100, modules 110 and 140 can each be fed using two extruders to produce alternating layers of olefin polymer/tie layer, repeated three times. The olefin polymer layers can be polyethylene, polypropylene, linear low density polyethylene, or a sealing material such as ethylene vinyl acetate copolymer. The tie layers can be polyolefin-based adhesive, ethylene vinyl acetate copolymer, ionomer, or the like. Modules 120 and 130 can be used to produce alternating nanolayers of barrier materials such as alternating layers of polyamide/ethylene vinyl alcohol. Alternatively, the nanolayers can be alternating layers of polyamide/adhesive tie layer, or ethylene vinyl alcohol/adhesive tie layer, or any suitable barrier structure. The complex multilayer films thus produced can be uniaxially or biaxially oriented using any of the techniques described above.

Referring to FIG. 17, a complex die 200 includes modules 210, 220, 230 and 240. In this example, all of the modules 210, 220, 230 and 240 are capable of producing nanolayers, and two, three or all four of the modules can be layer sequence repeater modules. In the embodiment shown, each of the modules 210, 230, and 240 is a layer sequence repeater module capable of producing multiple nanolayers. Each layer sequence repeater module has a disk arrangement similar to that described in Table 1, namely a first cap disk, a distribution disk and a second cap disk on each side of an alternating sequence of repeater disks and spreader disks. The layer sequence repeater modules can be configured to produce any desired number of nanolayers. For example, in the embodiment shown, layer sequence repeater modules 210 and 230 are each configured to produce 25 nanolayers, and layer sequence repeater module 140 is configured to produce 26 nanolayers. Module 220 can be, but need not be a layer sequence repeater module. In the embodiment shown, the module 220 produces only one nanolayer and may only include a first cap disk, a spreader disk, a second cap disk, a distribution disk and another first cap disk.

The embodiment of complex die 200 shown in FIG. 17 therefore produces a 77-nanolayer film, namely 25 layers from module 210, one layer from module 220, 25 layers from module 230 and 26 layers from module 240. The nanolayers can be alternating layers of two different materials supplied from two extruders, or can be one, three, four or more different materials fed from a corresponding number of extruders. The internal die gaps can be selected and varied according to the disk thicknesses. In the embodiment shown, the die gaps used to produce all 77 layers are 0.017 inch.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A layer sequence repeater module including a cell of axially disposed thin annular disks for a co-extrusion die, the cell of axially disposed thin annular disks comprising:
   at least one first cap disk including at least two entry openings;
   at least one second cap disk including a plurality of inner flow openings and at least one outer flow opening corresponding with one of the at least two entry openings of the first cap disk;
   at least one distribution disk, the distribution disk including a distribution inlet opening corresponding with one of the at least two entry openings of the first cap disk or one of the at least one outer flow opening of the second cap disk, a plurality of outlet openings corresponding with the plurality of inner flow openings of the second cap disk, and a channel connecting the distribution inlet opening and the plurality of outlet openings;
   a plurality of spreader disks, each spreader disk including at least one outer opening, a plurality of inner openings including a plurality of selections of inner openings, and a flow region connected to a first selection of inner openings; and
   at least one repeater disk in alternating sequence with the spreader disks and including a plurality of outer passage openings disposed around a circumference thereof and a plurality of circular inner passage openings disposed in a pattern that is concentric with the plurality of outer passage openings.

2. The layer sequence repeater module of claim 1, wherein a thickness of the at least one repeater disk is less than about 0.1 inch.

3. The layer sequence repeater module of claim 1, wherein the cell comprises at least two of the spreader disks, the repeater disk positioned between and axially adjacent to the two spreader disks.

4. The layer sequence repeater module of claim 1, wherein the cell comprises at least seven of the spreader disks, and repeater disks axially adjacent to each of the seven spreader disks.

5. The layer sequence repeater module of claim 1, wherein a thickness of each spreader disk is less than about 0.05 inch.

6. The layer sequence repeater module of claim 1, wherein the at least one distribution disk further includes a plurality of outer distributor openings and a plurality of inner distributor openings disposed in a pattern that is concentric with the plurality of outer distributor openings.

7. The layer sequence repeater module of claim 1, wherein each spreader disk comprises at least eight of the outer passage openings and at least eight of the inner passage openings.

8. The layer sequence repeater module of claim 1, wherein each spreader disk includes at least two selections of inner openings, each selection of inner openings accommodating a different melt.

9. The layer sequence repeater module of claim 1, wherein the cell of axially disposed thin annular disks comprises at least one sequence of the following axially adjacent disks: first cap disk, distribution disk, second cap disk, repeater disk, spreader disk.

10. The layer sequence repeater module of claim 9, wherein the cell of axially disposed thin annular disks comprises two of said sequences in reverse order.

11. The layer sequence repeater module of claim 1, further comprising one or more cells of axially disposed annular disks.

12. A cell of a plurality of axially disposed thin annular disks for a co-extrusion die, the cell comprising:
at least one first cap disk including a plurality of entry openings;
at least one second cap disk including a plurality of outer flow openings and a plurality of inner flow openings, wherein at least one outer flow opening corresponds with one entry opening of the first cap disk; and
at least one distribution disk sandwiched between the first cap disk and the second cap disk, the distribution disk including a distribution inlet opening corresponding with one of the plurality of entry openings of the first cap disk or one of the plurality of outer flow openings of the second cap disk, a plurality of outlet openings corresponding with the plurality of inner flow openings of the second cap disk, and a channel connecting the distribution inlet opening and the plurality of outlet openings;
a plurality of spreader disks, each spreader disk including at least one outer opening, a plurality of inner openings comprising a first selection of inner openings and a second selection of inner openings, and a flow region connected with the first selection of inner openings; and
a plurality of repeater disks in alternating sequence with the spreader disks, each repeater disk including at least one outer passage opening and a plurality of circular inner passage openings, the plurality of spreader disks and the plurality of repeater disks alternately disposed between at least two of the distribution disks.

13. The cell of claim 12, wherein the cap, distribution, spreader and repeater disks are configured and arranged to distribute a first melt stream flowing in a first direction and a second melt stream flowing in a second direction opposite the first direction.

14. The cell of claim 13, wherein the cap, distribution, spreader and repeater disks are configured and arranged to distribute a third melt flowing from at least one of the first and second directions.

15. The cell of claim 12, wherein the plurality of inner passage openings includes a plurality of selections of inner passage openings, each plurality of selections of inner passage openings accommodating a different melt.

16. The cell of claim 12, wherein each repeater disk includes a plurality of outer passage openings.

17. The cell of claim 16, wherein at least one repeater disk comprises a termination point terminating a flow of a melt at the repeater disk.

18. A layer sequence repeater module, comprising at least one cell including a plurality of thin, axially disposed annular disks, the cell comprising:
at least one first cap disk including at least two entry openings;
at least one second cap disk including a plurality of inner flow openings and at least one outer flow opening corresponding with an entry opening in the first cap disk;
at least one distribution disk between the first cap disk and the second cap disk, for distributing one or more melt streams; and
a plurality of spreader disks and repeater disks arranged in alternating sequence, each spreader disk including at least one outer opening and a plurality of inner openings in communication with a flow region, each repeater disk including a plurality of outer passage openings and a plurality of circular inner passage openings disposed in a pattern that is concentric with the plurality of outer passage openings.

19. A coextrusion die, comprising a layer sequence repeater module, the layer sequence repeater module comprising:
at least one first cap disk including at least two entry openings;
at least one second cap disk including a plurality of inner flow openings and at least one outer flow opening corresponding with one of the at least two entry openings of the first cap disk;
at least one distribution disk, the distribution disk including a distribution inlet opening corresponding with one of the at least two entry openings of the first cap disk or one of the at least one outer flow opening of the second cap disk, a plurality of outlet openings corresponding with the plurality of inner flow openings of the second cap disk, and a channel connecting the distribution inlet opening and the plurality of outlet openings;
a plurality of spreader disks, each spreader disk including at least one outer opening, a plurality of inner openings including a plurality of selections of inner openings, and a flow region connected to a first selection of inner openings; and
at least one repeater disk in alternating sequence with the spreader disks and including a plurality of outer passage openings disposed around a circumference thereof and a plurality of circular inner passage openings disposed in a pattern that is concentric with the plurality of outer passage openings.

20. The coextrusion die of claim 19, comprising at least two of the layer sequence repeater modules.

21. The coextrusion die of claim 19, comprising at least three of the layer sequence repeater modules.

22. The coextrusion die of claim 19, further comprising a modular disk coextrusion die module on one or both sides of the layer sequence repeater module, each modular disk coextrusion die module comprising a first cap disk, a distribution disk, a second cap disk, a spreader disk, and a third cap disk.

23. The coextrusion die of claim 19, wherein the layer sequence repeater module comprises at least twenty of the spreader disks and at least twenty of the repeater disks.

* * * * *